United States Patent

Bosley et al.

[11] Patent Number: 5,752,380
[45] Date of Patent: May 19, 1998

[54] LIQUID FUEL PRESSURIZATION AND CONTROL SYSTEM

[75] Inventors: Robert W. Bosley, Cerritos; Edward C. Edelman, Agoura Hills; Steven W. Lampe, Thousand Oaks; Ronald F. Miller, Marina del Rey, all of Calif.

[73] Assignee: Capstone Turbine Corporation, Tarzana, Calif.

[21] Appl. No.: 730,941

[22] Filed: Oct. 16, 1996

[51] Int. Cl.$^6$ ................................ F02C 9/26
[52] U.S. Cl. ........................ 60/39.281; 60/734
[58] Field of Search ................ 60/39.281, 734, 60/739, 740, 741; 417/44.2, 45; 290/40 F

[56] References Cited

U.S. PATENT DOCUMENTS

| | | |
|---|---|---|
| 3,335,567 | 8/1967 | Hemsworth . |
| 3,662,546 | 5/1972 | Ifield . |
| 3,696,612 | 10/1972 | Berman ........................... 60/39.281 |
| 3,784,329 | 1/1974 | Crawley . |
| 4,011,717 | 3/1977 | Turner et al. . |
| 4,110,974 | 9/1978 | Herman . |
| 4,640,093 | 2/1987 | Eastman . |
| 4,729,218 | 3/1988 | Haselbauer et al. ............ 60/734 |
| 4,815,278 | 3/1989 | White ........................... 60/39.281 |
| 4,817,389 | 4/1989 | Holladay et al. . |
| 4,833,880 | 5/1989 | Chapin . |
| 4,926,629 | 5/1990 | Eick et al. . |
| 5,118,258 | 6/1992 | Martin ........................... 60/734 |
| 5,148,671 | 9/1992 | Kast et al. . |
| 5,224,333 | 7/1993 | Bretz et al. ................... 60/740 |
| 5,284,020 | 2/1994 | Brocard et al. . |
| 5,331,814 | 7/1994 | Sandelis . |
| 5,341,635 | 8/1994 | Kast et al. . |
| 5,345,757 | 9/1994 | MacLean et al. . |

FOREIGN PATENT DOCUMENTS

| | | |
|---|---|---|
| 2696211 | 1/1994 | France . |
| 622904 | 6/1949 | United Kingdom . |
| 625776 | 8/1949 | United Kingdom . |
| 655780 | 8/1951 | United Kingdom . |
| 726491 | 3/1955 | United Kingdom . |
| 1376746 | 12/1974 | United Kingdom . |
| 1504348 | 3/1978 | United Kingdom . |
| 1539734 | 1/1979 | United Kingdom . |
| 2206159 | 12/1988 | United Kingdom . |
| 2219045 | 11/1989 | United Kingdom . |
| 2239056 | 6/1991 | United Kingdom . |

*Primary Examiner*—Louis J. Casaregola
*Attorney, Agent, or Firm*—Albert J. Miller

[57] ABSTRACT

A liquid fuel pressurization and control system is disclosed which utilizes either a helical flow pump, or a helical flow pump followed by a gear pump, to pressurize liquid fuel to precisely the pressure level required by a turbogenerator's combustor injectors. This eliminates the need to overpressurize the fuel then regulate the fuel pressure down using a flow control valve or a pressure control valve. The shaft torque and shaft speed of the pump are controlled by the turbogenerator's power controller so as to assure that the turbogenerator's speed is precisely controlled (e.g. within ten (10) rpm out of one hundred thousand (100,000) rpm), and that its turbine exhaust temperature is precisely controlled (e.g. within two (2) degrees Fahrenheit out of twelve hundred (1200) degrees Fahrenheit) over the full range of turbogenerator electrical output power. The system also provides cool, high pressure air to assist atomization of the liquid fuel in the injectors utilizing a variable speed helical flow compressor. The system also adjusts the relative fuel flow through the multiple fuel injectors to aid flame stability at low turbogenerator speeds and low output power levels.

59 Claims, 12 Drawing Sheets

LIQUID FUEL PRESSURIZATION AND CONTROL SYSTEM

TECHNICAL FIELD

This invention relates to the general field of turbogenerators and more particularly to an improved liquid fuel pressurization and control system for a turbogenerator.

BACKGROUND OF THE INVENTION

In a turbogenerator generating electricity and operating on a liquid fuel, it is necessary to increase the pressure of and atomize or vaporize the liquid fuel to be provided to the turbogenerator combustor. In addition, it is also desirable to increase the pressure of some of the turbogenerator compressor discharge air which is nominally supplied to the turbogenerator combustor and use this additionally compressed air to assist liquid fuel atomization in special fuel/air injectors used in the combustor. In order to have complete combustion, without the generation of undesirable combustion products such as COx and NOx, it is critical that the liquid fuel be completely atomized or vaporized when it enters the turbogenerator combustor. Further, if not fully atomized, the liquid fuel can leave varnish on any metal surfaces that it comes into contact with. The increased pressure liquid fuel and the increased pressure turbogenerator compressor discharge air (air assist air) can work together to accomplish complete atomization.

In addition, if the liquid fuel is at too high a temperature, the fuel injectors which deliver the liquid fuel to the turbogenerator can become vapor locked which will disrupt the continued flow of the liquid fuel to the combustor. It is, therefore, essential that the temperature of the liquid fuel be maintained below the temperature at which vapor lock can occur. Means to cool the liquid fuel may be required.

In a conventional turbogenerator operating on a liquid fuel, the speed of the turbogenerator is normally controlled by the interaction of liquid fuel flow rate and the load of the turbogenerator electrical output. Besides requiring a separate liquid fuel control and/or metering valve to regulate the liquid fuel flow rate, such a system requires a turbogenerator speed sensor, requires a turbogenerator turbine exhaust temperature sensor, is dependent upon turbogenerator load, would not be self-damping, and has certain inherent instabilities.

Further, in the operation of a turbogenerator, it has been difficult to sustain low power output operation. Inherently, the turbogenerator is designed for a continuous, steady-state, full power operation. When a low power output is required to be sustained, the fuel system does not inherently have the capability to adequately deal with this type of operation without some special measures being taken.

A new type of fuel pump and a new type of compressor to supply air assistance for fuel/air injectors appears to be warranted. Centrifugal pumps and compressors are potential candidates for both liquid fuel pressurization and control and for air compression used for fuel/air atomizing injectors. However, centrifugal pumps and compressors operate best (with high efficiencies) when they have a high throughput flow rate and a low pressure rise relative to their tip speed. These operating conditions are characterized as high specific-speed conditions. Under these conditions, a centrifugal compressor can operate with an efficiency on the order of seventy-eight percent (78%). But the flow rate and pressure rise requirements for fuel pressurization and air assist compression for the liquid fuel pressurization and control system are for low specific-speed compressors (low throughput flow rate and high pressure rise relative to the compressor's tip speed). A centrifugal pump and compressor operating under these conditions would have an efficiency of less than twenty percent (20%). Under these conditions it would require a very large number of centrifugal compressors in series (e.g. ten (10)) to produce the same pressure rise for a given tip speed as could one (1) helical flow compressor.

A helical flow compressor is a high-speed rotating machine that accomplishes compression by imparting a velocity head to each fluid particle as it passes through the machine's impeller blades and then converting that velocity head into a pressure head in a stator channel that functions as a vaneless diffuser. While in this respect a helical flow compressor has some characteristics in common with a centrifugal compressor, the primary flow in a helical flow compressor is peripheral and asymmetrical, while in a centrifugal compressor, the primary flow is radial and symmetrical. The fluid particles passing through a helical flow compressor travel around the periphery of the helical flow compressor impeller within a generally horseshoe shaped stator channel. Within this channel, the fluid particles travel along helical streamlines, the centerline of the helix coinciding with the center of the curved stator channel. This flow pattern causes each fluid particle to pass through the impeller blades or buckets many times while the fluid particles are traveling through the helical flow compressor, each time acquiring kinetic energy. After each pass through the impeller blades, the fluid particles reenter the adjacent stator channel where they convert their kinetic energy into potential energy and a resulting peripheral pressure gradient in the stator channel. The multiple passes through the impeller blades (regenerative flow pattern) allows a helical flow compressor to produce discharge heads of up to fifteen (15) times those produced by a centrifugal compressor operating at equal tip speeds. A helical flow compressor operating at low specific-speed and at its best flow can have efficiencies of about fifty-five percent (55%) with curved blades and can have efficiencies of about thirty-eight percent (38%) with straight radial blades.

A helical flow pump has the same basic design as a helical flow compressor.

Among the advantages of a helical flow pump or compressor or a helical flow turbine are:

(a) simple, reliable design with only one rotating assembly;

(b) stable, surge-free operation over a wide range of operating conditions (i.e. from full flow to no flow);

(c) long life (e.g., 40,000 hours) limited mainly by their bearings;

(d) freedom from wear product and oil contamination since there are no rubbing or lubricated surfaces utilized;

(e) fewer stages required when compared to a centrifugal compressor; and (f) higher operating efficiencies when compared to a very low specific-speed (high head pressure, low impeller speed, low flow) centrifugal compressor.

The flow in a helical flow pump or compressor can be visualized as two fluid streams which first merge and then divide as they pass through the pump or compressor. One fluid stream travels within the impeller buckets and endlessly circles the pump or compressor. The second fluid stream enters the pump or compressor radially through the inlet port and then moves into the horseshoe shaped stator channel which is adjacent to the impeller buckets. Here the fluids in the two streams merge and mix. The stator channel and impeller bucket streams continue to exchange fluid while the stator channel fluid stream is drawn around the pump or compressor by the impeller motion. When the stator channel fluid stream has traveled around most of the compressor periphery, its further circular travel is blocked by the stripper plate. The stator channel fluid stream then turns radially outward and exits from the compressor through the discharge port. The remaining impeller bucket fluid stream passes through the stripper plate within the buckets and merges with the fluid just entering the compressor/turbine.

The fluid in the impeller buckets of a helical flow pump or compressor travels around the compressor at a peripheral velocity which is essentially equal to the impeller blade velocity. It thus experiences a strong centrifugal force which tends to drive it radially outward, out of the buckets. The fluid in the adjacent stator channel travels at an average peripheral velocity of between five (5) and eighty (80) percent of the impeller blade velocity, depending upon the pump or compressor discharge flow. It thus experiences a centrifugal force which is much less than that experienced by the fluid in the impeller buckets. Since these two centrifugal forces oppose each other and are unequal, the fluid occupying the impeller buckets and the stator channel is driven into a circulating or regenerative flow. The fluid in the impeller buckets is driven radially outward and "upward" into the stator channel. The fluid in the stator channel is displaced and forced radially inward and "downward" into the impeller bucket.

While the fluid in either a helical flow pump or compressor is traveling regeneratively, it is also traveling peripherally around the stator-impeller channel. Thus, each fluid particle passing through a helical flow pump or compressor travels along a helical streamline, the centerline of the helix coinciding with the center of the generally horseshoe shaped stator-impeller channel.

SUMMARY OF THE INVENTION

In the present invention, the liquid fuel pressurization and control system and method utilizes a pump whose speed and shaft torque directly controls the pressure of the liquid fuel delivered to the turbogenerator combustor. This method includes establishing the turbogenerator speed and turbogenerator turbine discharge gas temperature required based upon the power load requirements of the turbogenerator, establishing the liquid fuel pressure requirements to produce the established turbogenerator speed and temperature, and commanding the pump to produce the established liquid fuel pressure by controlling the speed or the torque of the pump.

The liquid fuel pressurization and control system for a turbogenerator includes a pump for supplying pressurized liquid fuel to the liquid fuel injectors of the turbogenerator combustor while the turbogenerator compressor supplies pressurized combustion air to the turbogenerator combustor. A motor, such as a permanent magnet motor, drives the compressor. A compressor motor inverter drive provides electrical power to the motor and receives operational speed and phase data from the motor. The inverter drive also receives torque and maximum speed control signals from the turbogenerator power controller which receives a speed feedback signal from the compressor motor inverter drive. A turbogenerator speed signal and a turbine exhaust gas temperature signal are provided to the turbogenerator power controller from the turbogenerator. A separate compressor can also be utilized to increase the pressure of the turbogenerator compressor discharge air to provide an air assist to the turbogenerator combustor nozzles and also to cool the liquid fuel. A helical flow compressor and pump can be utilized as the compressor and pump for the liquid fuel pressurization and for the air assist compression.

A helical flow compressor system is typically thirty (30) to forty (40) times smaller than systems with reciprocating compressors; consumes about one-third (⅓) of the energy that other liquid fuel pressurization systems use; does not require the use of an accumulator; does not compress the liquid fuel to a pressure that is higher than is needed and then throw the extra pressure away through valve based flow or pressure regulation; does not cycle on and off; does not operate in a pulsed mode; and is very fast and responsive being controlled by the same computer that controls the entire turbogenerator combustion process.

The helical flow compressor is driven at high speed on the order of twenty four thousand (24,000) rpm by a permanent magnet motor/generator. It is designed to produce very high pressure for a given tip speed of impeller.

A conventional centrifugal pump takes liquid fuel such as diesel oil or gasoline and passes it through an impeller blade which imparts kinetic energy to the liquid fuel. That kinetic energy or velocity energy is converted to pressure energy in a diffuser channel. This happens once each time the liquid fuel goes through the pump. In order to obtain a large pressure rise, you either have to have a high speed impeller with a large diameter, or you have to have a large number of compression stages.

A helical flow pump or compressor also takes inlet liquid fuel or air into the impeller blade where it picks up kinetic energy or velocity energy and then the liquid fuel or air goes into a stator channel (which is in effect a vaneless diffuser) where the kinetic energy is turned back into pressure energy. While this happens only once in the typical centrifugal pump or compressor, it typically happens twelve (12) to fifteen (15) times in a helical flow pump or compressor. Thus, you can obtain about twelve (12) to fifteen (15) times as much pressure rise in a single stage of a helical flow pump or compressor as you can obtain in a single stage of a centrifugal pump or compressor.

The helical flow compressor is also designed to produce very low flows whereas the centrifugal compressor requires higher flows for greater efficiency. Because of this, centrifugal compressors operating at high flows have higher efficiencies than helical flow compressors running at their best efficiencies. When, however, you compare centrifugal compressors with helical flow compressors with the same low flows, helical flow compressors actually have higher efficiencies. A centrifugal compressor operating at its best operating condition would be operating at about a seventy eight percent (78%) efficiency. The centrifugal compressor would, however, be operating at its best flow which will be well above the flows needed by the turbogenerator. The helical flow compressor operating at its best flow can have efficiencies with curved blades of about fifty five percent (55%) and with straight blades of about thirty eight percent (38%). The efficiency of the helical flow compressor with straight blades for the flows required by the turbogenerator is about twenty five percent (25%) and with curved blades may be slightly over thirty percent (30%). On the other hand, the centrifugal compressor would be under twenty percent (20%) because it would be operating at such a low flow, well below where it is designed to operate at. At these low flows, there is a lot of scroll leakage losses in the centrifugal compressor.

The helical flow compressor has a lightweight wheel or impeller for a given throughput flow rate and pressure rise.

The centrifugal compressor will be somewhat heavier with less ability to accelerate and decelerate than the helical flow compressor. If both a centrifugal compressor and a helical flow compressor are both designed to provide what the turbogenerator requires, the impeller of the helical flow compressor would be much lighter and much easier to accelerate and decelerate than the impeller of the centrifugal compressor.

Since the pressure of the liquid fuel introduced into the turbogenerator combustor is a function of the speed of the helical flow pump, the system computer can control the data which controls the motor which controls the pump and effectively has the computer control either the pressure or the flow of the helical flow pump which is pressurizing the liquid fuel. In a helical flow pump driven by a permanent magnet motor, or by an induction motor, you can control the torque the motor makes or control the speed or a mix of the two. Typically in this application, the torque is controlled since that controls the pressure rise of the compressor. The buckets have a known cross sectional area at a known radius to the center of the motor shaft. Thus, there is a given pressure rise for a given motor torque. The liquid fuel to the turbogenerator can therefore be effectively controlled.

After ignition, combustion generated turbine torque accelerates the turbogenerator which raises the pressure of the turbogenerator compressor. As the turbogenerator compressor increases the pressure of the combustion air, you will also need to increase the liquid fuel pressure to keep it somewhat higher so that there is a positive flow of liquid fuel to the combustor injectors. If for any reason the turbogenerator gets to a speed so as to produce more turbogenerator compressor discharge pressure than the liquid fuel pressure, the liquid fuel flow will stop and no liquid fuel will enter the turbogenerator combustor and the turbogenerator goes down in speed. This in fact constitutes a speed control mechanism which works extremely well.

A conventional liquid fuel pressurization and control system controls the fuel flow rate delivered to the turbogenerator but not the pressure of the fuel delivered to the turbogenerator. If the flow is held constant the turbogenerator speed can run away when the electric power load suddenly drops off. If the electrical load coming out of the turbogenerator drops off, more torque is available from the turbine to accelerate the wheel. The problem is controlling the speed in the system based upon the control of flow of liquid fuel. Only a high speed, high gain servosystem can prevent speed surges if fuel flow is controlled rather that fuel pressure.

In the present invention, the pressure rather than the mass flow of the liquid fuel is controlled and set to a pressure such as of twenty five (25) psi gauge. The turbogenerator will automatically accelerate if the compressor discharge pressure is twenty three (23) psi gauge. At that point, the turbogenerator is getting the amount of fuel it needs to run. With a drop off of load at the turbogenerator, the most that the turbogenerator speed can increase is that change in speed associated with an increase of two (2) psi in compressor discharge pressure. The speed goes up about three percent (3%) or four percent (4%) (considered to be a speed error) and stabilizes out as the gaseous fuel flow naturally drops down. Essentially what the computer based control logic does is reduce this small error by using a limited amount of gain or by using limited authority integration reducing this small error to essentially zero with small variations in fuel pressure. This makes a stable servocontrol.

With prior art technology, there is almost no gain in the turbogenerator by virtue of the fuel fluidics and the compressed air pneumatics, the gain is all in the computer that is controlling the liquid fuel and that's a hard thing to do. What is done in the present invention is to use the turbogenerator as a moderate gain servosystem on its own right. If you control the fuel pressure, you control the turbogenerator speed within a five percent (5%) tolerance range for a wide range of output power. The turbogenerator keeps itself from overspeeding and enables the system to get by with a very low gain (thus stable) servosystem that is computer based. Noting the power that the customer wants electrically, the computer goes to look-up tables to determine the speed and temperature at which the turbogenerator should be operating to produce that power. Another look-up table determines what pressure the liquid fuel should have to be consistent with that selected turbogenerator speed and temperature. The fuel pressure is then commanded to be equal to that level by changing the speed of the helical flow pump or by changing the torque of the helical flow pump motor. These conditions are obtained with a very small error because the prediction algorithms can be extremely accurate. A very small authority or limited gain integral proportional controller algorithm can trim out the last errors in speed, exhaust gas temperature, or output power.

A liquid fuel pressurization and control system based on the present invention stabilizes much faster than systems that over pressurize the fuel, then reduce the fuel pressure with a mass flow control valve. It has been demonstrated that this system can control a turbogenerator over a speed range of twenty four thousand (24,000) rpm to ninety six thousand (96,000) rpm and can control the turbogenerator speed to within ten (10) rpm and that it can also control the turbine exhaust temperature to within two (2) degrees Fahrenheit. It is a very friendly system which does not overshoot and is capable of overcoming many of the difficulties of prior systems.

It is therefore a principle objective of the present invention to provide an improved liquid fuel pressurization and control system and method for a turbogenerator.

It is another objective of the present invention to provide a liquid fuel pressurization and control system having means to pressurize liquid fuel to the precise pressure required by a turbogenerator combustor's injection nozzles.

It is another objective of the present invention to provide a liquid fuel pressurization and control system that does not pressurize the liquid fuel to a pressure substantially above that required by a turbogenerator combustor's injection nozzles then subsequently subregulate that pressure down to the level required by the nozzles.

It is another objective of the present invention to provide a liquid fuel pressurization and control system that does not require a mass flow control valve or a pressure control valve to assure that the liquid fuel is pressurized to the precise pressure required by a turbogenerator combustor's injection nozzles.

It is another objective of the present invention to provide a liquid fuel pressurization and control system that utilizes a variable speed pump to both pressurize the liquid fuel and to control its pressure and flow to precisely match the requirements of the turbogenerator combustor's injection nozzles with no subsequent valve based subregulation.

It is another objective of the present invention to provide a liquid fuel pressurization and control system that utilizes a variable speed pump having electrical power requirements much lower than those of an automotive fuel pump (owing to pumping only the pressure needed by the turbogenerator rather than overpumping then subregulating) and having this pump submersion mounted in the fuel tank.

It is another object of the present invention to provide a liquid fuel pressurization and control system having a compressor that does not have output flow rates or output pressures that pulsate.

It is another object of the present invention to provide a liquid fuel pressurization and control system having a compressor that does not have to be cycled on and off to control the average liquid fuel discharge pressure.

It is another objective of the present invention to provide a liquid fuel pressurization and control system that utilizes either a helical flow pump, or a helical flow pump followed by a gear pump, to pressurize the liquid fuel to precisely the pressure required by a turbogenerator combustor's injection nozzles with no subsequent valve based subregulation.

It is another objective of the present invention to provide a liquid fuel pressurization and control system that utilizes a pump that is integrated with a drive motor and mounts the rotating pump elements on the same shaft on which is mounted the motor rotor.

It is another objective of the present invention to provide a liquid fuel pressurization and control system that utilizes a pump motor and motor inverter drive that can be commanded to produce a given motor/pump shaft torque or can be commanded to produce a given shaft speed and in any case will provide a signal that is a function of shaft speed. Note that if the pump motor is a d.c. motor (shunt or otherwise) this objective can be met with interdependent control of motor current and voltage.

It is another objective of the present invention to provide a liquid fuel pressurization and control system that, through fuel control, can control turbogenerator speed to within 10 rpm over an operating speed range of zero to 100,000 rpm and can control turbine exhaust temperature to within 2 degrees Fahrenheit over an operating range of 300 degrees Fahrenheit to 1200 degrees Fahrenheit for the entire output power range.

It is another objective of the present invention to provide a liquid fuel pressurization and control system having means to supply cool air at up to 6 psig above turbogenerator centrifugal compressor discharge pressure to assist atomization of the liquid fuel in the turbogenerator combustor's air assisted injector nozzles.

It is another objective of the present invention to provide a liquid fuel pressurization and control system utilizing a variable speed compressor to further pressurize some of the air from the turbogenerator centrifugal compressor discharge in order to supply cool air at up to 6 psig above turbogenerator compressor discharge pressure to assist atomization of the liquid fuel in the turbogenerator combustor's air assisted injector nozzles.

It is another objective of the present invention to provide a liquid fuel pressurization and control system utilizing a variable speed helical flow compressor to further pressurize some of the air from the turbogenerator centrifugal compressor discharge in order to supply cool air at up to 6 psig above turbogenerator compressor discharge pressure to assist atomization of the liquid fuel in the turbogenerator combustor's air assisted injector nozzles.

It is another objective of the present invention to provide a liquid fuel pressurization and control system that varies the speed of the helical flow air atomization assist compressor to provide adequate but not excessive air for atomization and adequate but not excessive air for fuel cooling in the injector nozzles (to prevent vapor lock) without utilizing excess electrical motor/inverter power.

It is another objective of the present invention to provide a liquid fuel pressurization and control system that can reduce the fuel flow through some of the liquid fuel injector nozzles under conditions of low turbogenerator speed and low turbogenerator combustion temperature in order to stabilize the combustion flame, avoid flameouts and reduce the turbogenerator idle speed and idle fuel consumption.

It is another objective of the present invention to provide a liquid fuel pressurization and control system that can reduce the fuel flow through some of the liquid fuel injector nozzles under conditions of low turbogenerator speed and low turbogenerator combustion temperature utilizing solenoid shut-off valves that are sequentially activated for each injector nozzle based on turbogenerator speed and/or turbogenerator turbine exhaust temperature and/or fuel flow rate.

It is another objective of the present invention to provide a liquid fuel pressurization and control system that can reduce the fuel flow through some of the liquid fuel injector nozzles under conditions of low turbogenerator speed and low turbogenerator combustion temperature utilizing a proportional valve or multiple proportional valves that have their flow conductances adjusted as a function of turbogenerator speed and/or turbogenerator turbine exhaust temperature and/or fuel flow rate.

It is another objective of the present invention to provide a liquid fuel pressurization and control system that can reduce the fuel flow through some of the liquid fuel injector nozzles under conditions of low turbogenerator speed and low turbogenerator combustion temperature utilizing a flexure valve or multiple flexure valves that have their flow conductances adjusted as a function of fuel pressure. These flexure valves use no solenoid, use no electrical power, require no conditioning and control circuitry. They are controlled and powered solely by the pressure of the liquid fuel used by the injector nozzles.

It is another objective of the present invention to provide a liquid fuel pressurization and control system that controls the torque and speed of the utilizes either a helical flow pump, or a helical flow pump followed by a gear pump, to pressurize the liquid fuel to precisely the pressure required by a turbogenerator combustor's injection nozzles with no subsequent valve based subregulation.

BRIEF DESCRIPTION OF THE DRAWINGS

Figure 1:
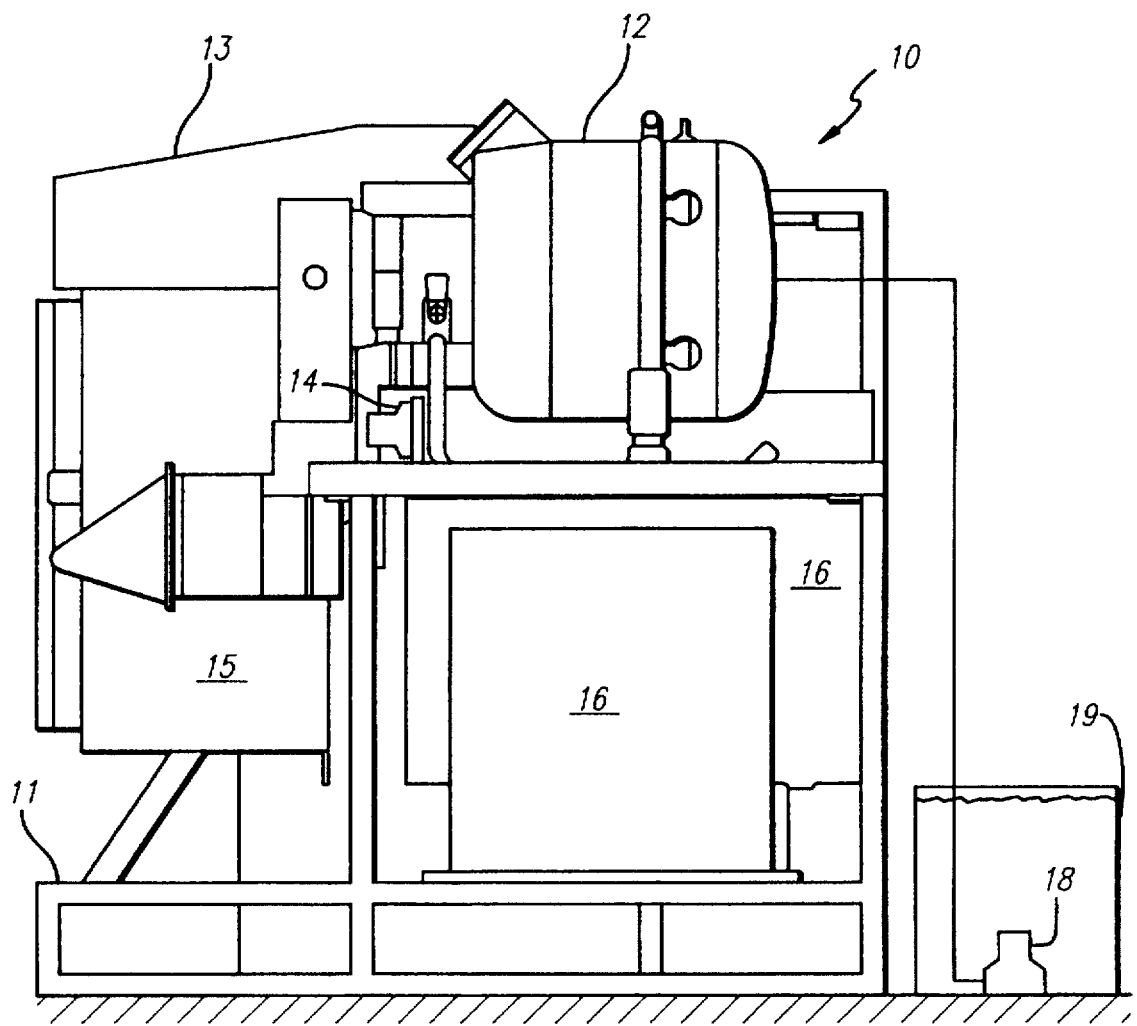
Figure 2:
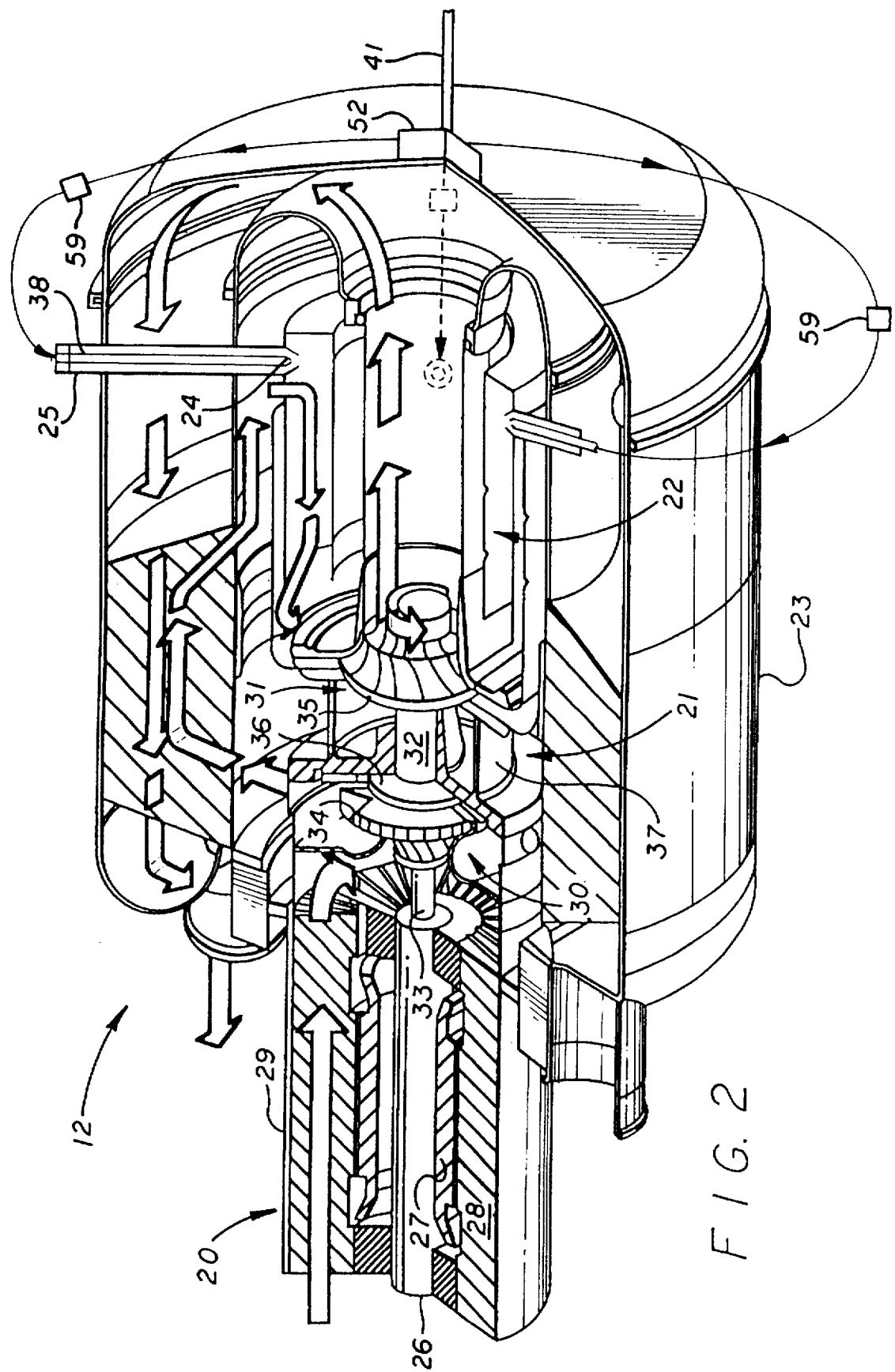
Figure 3:
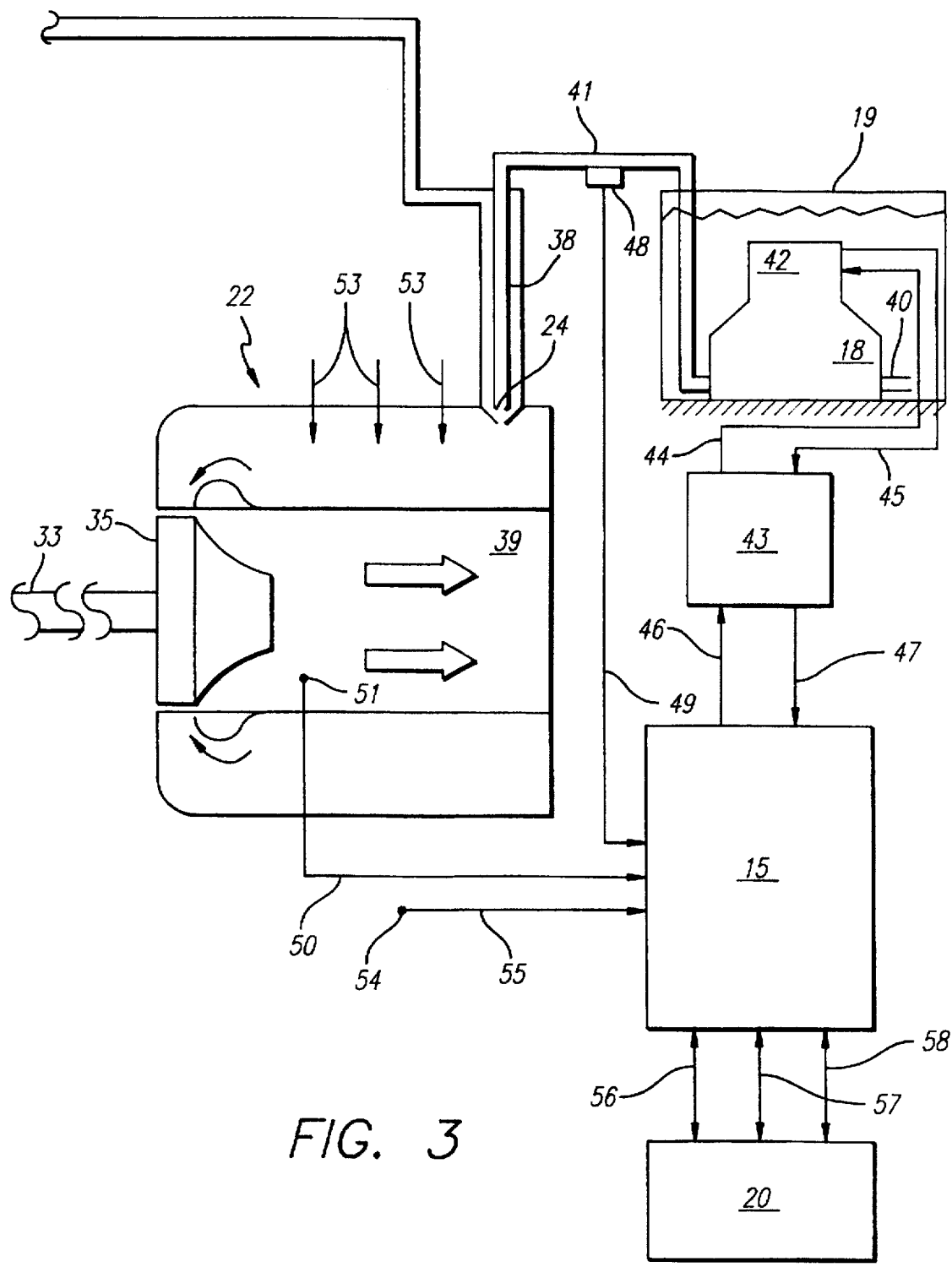
Figure 4:
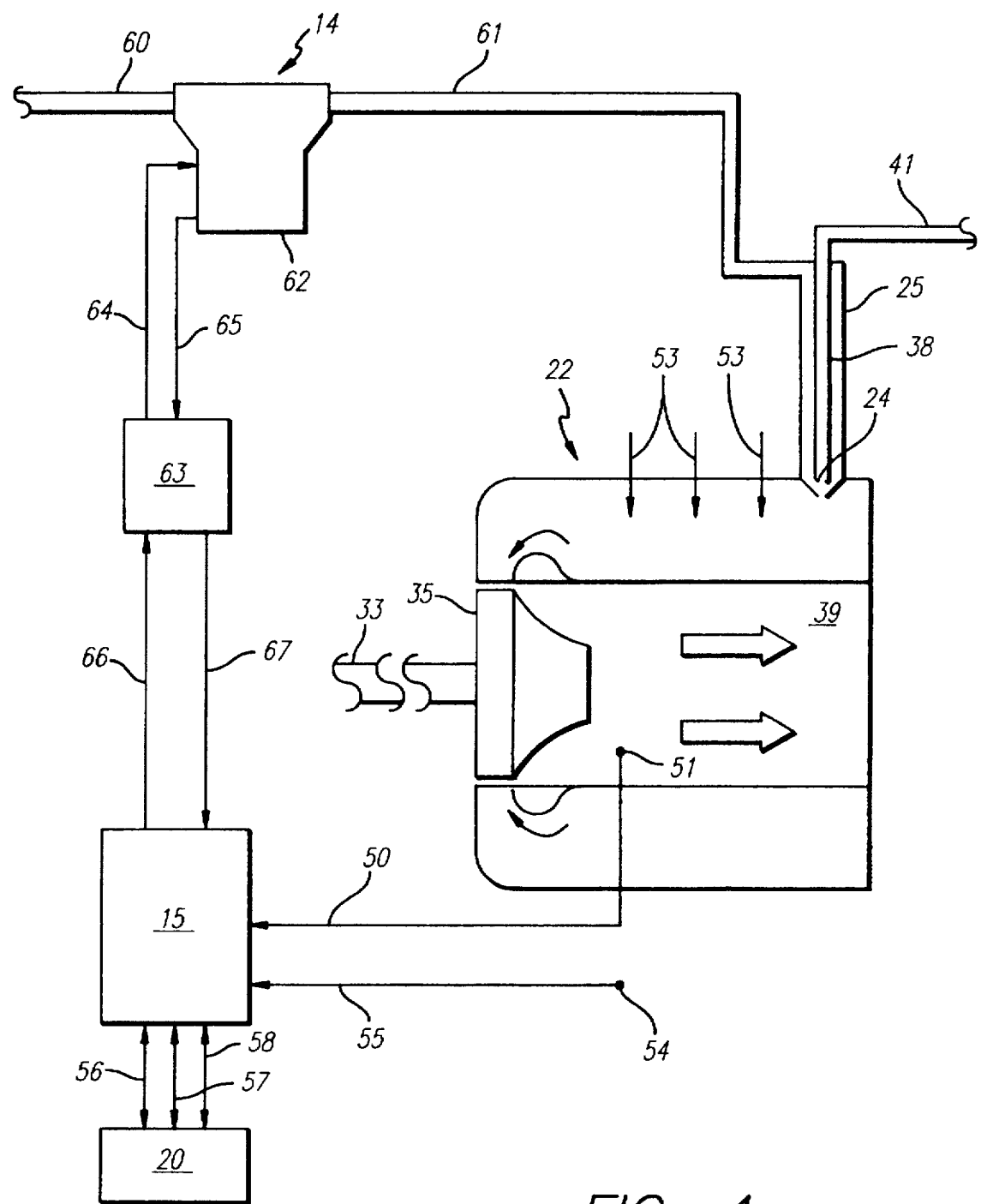
Figure 5:
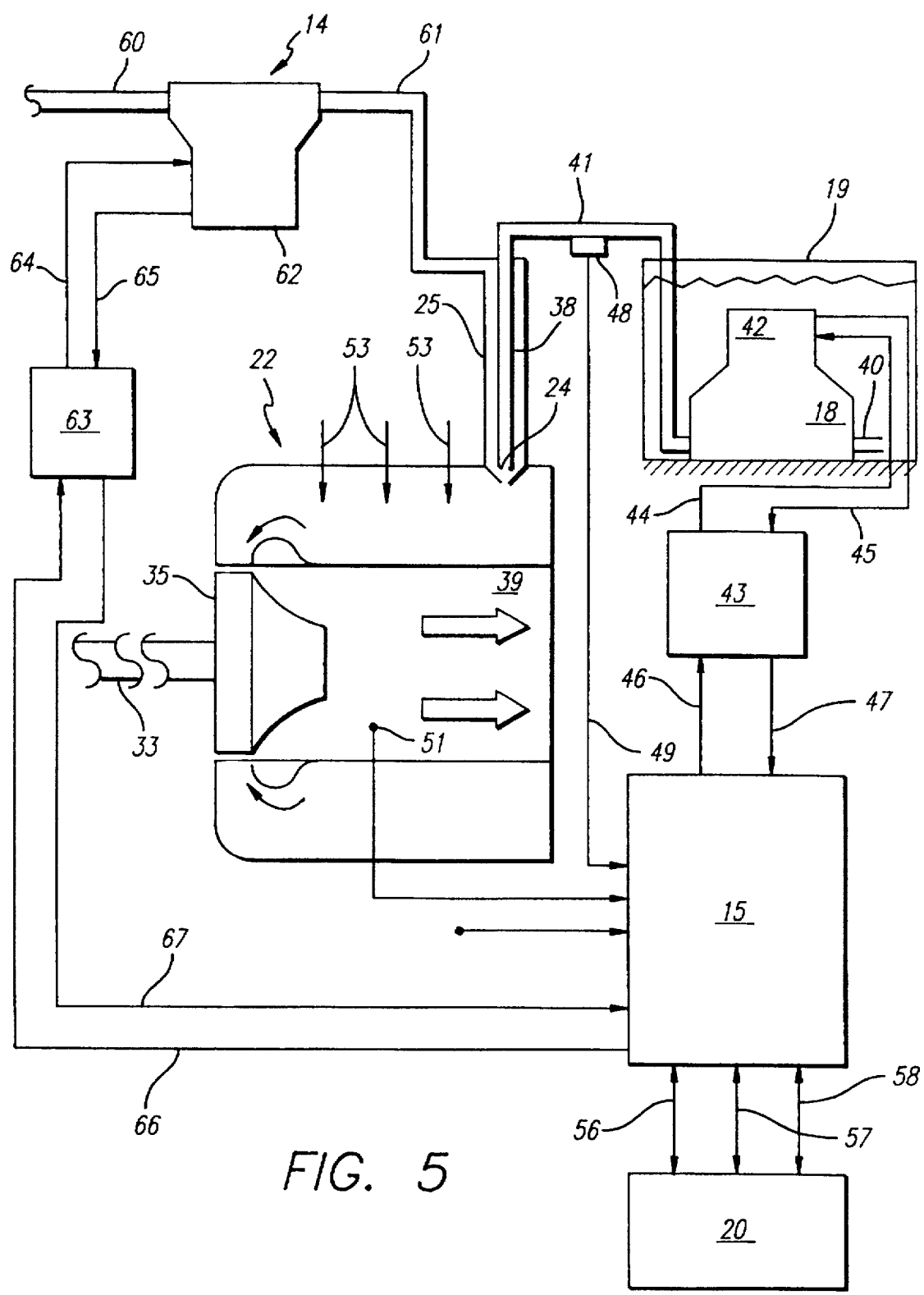
Figure 6:
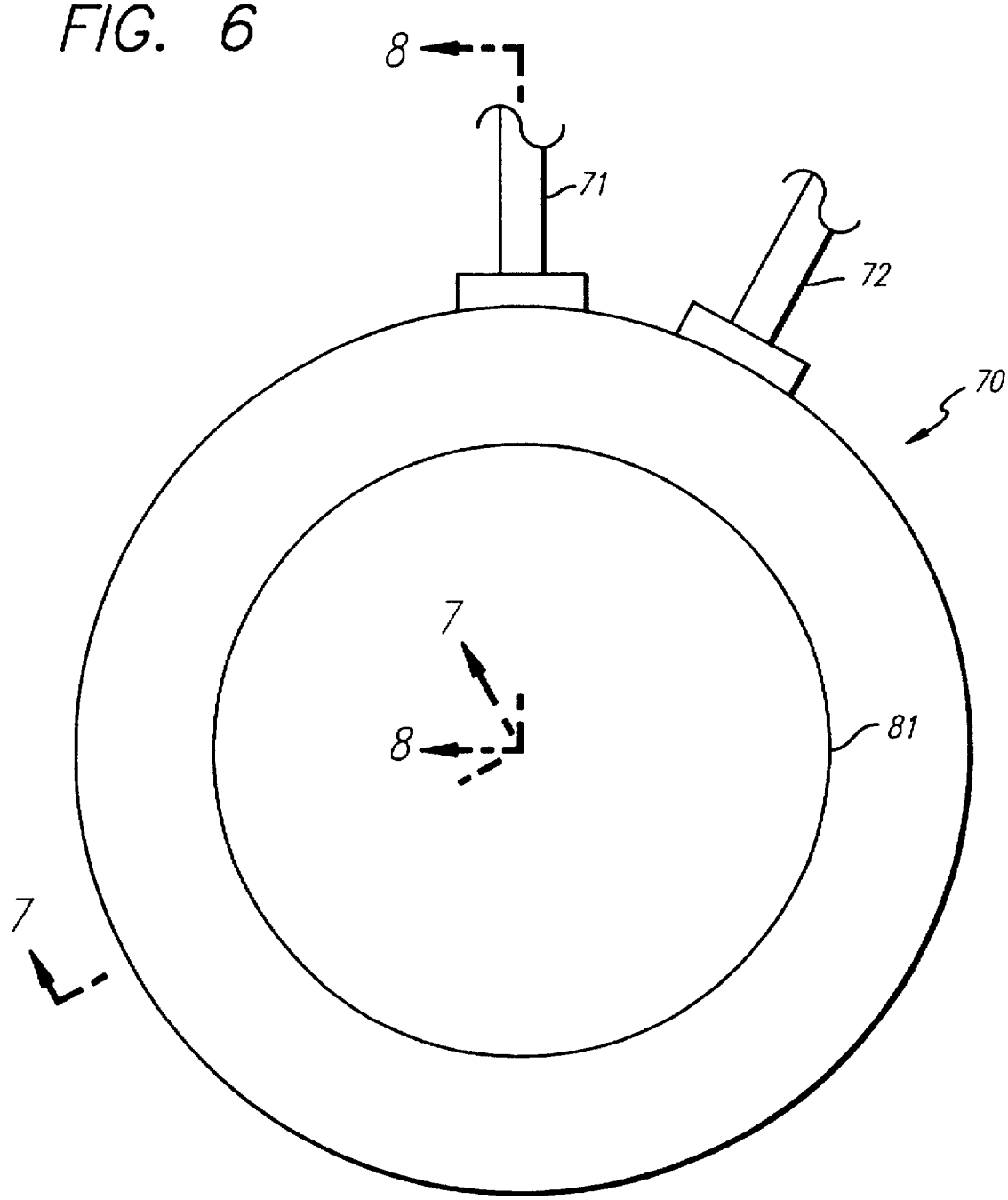
Figure 7:
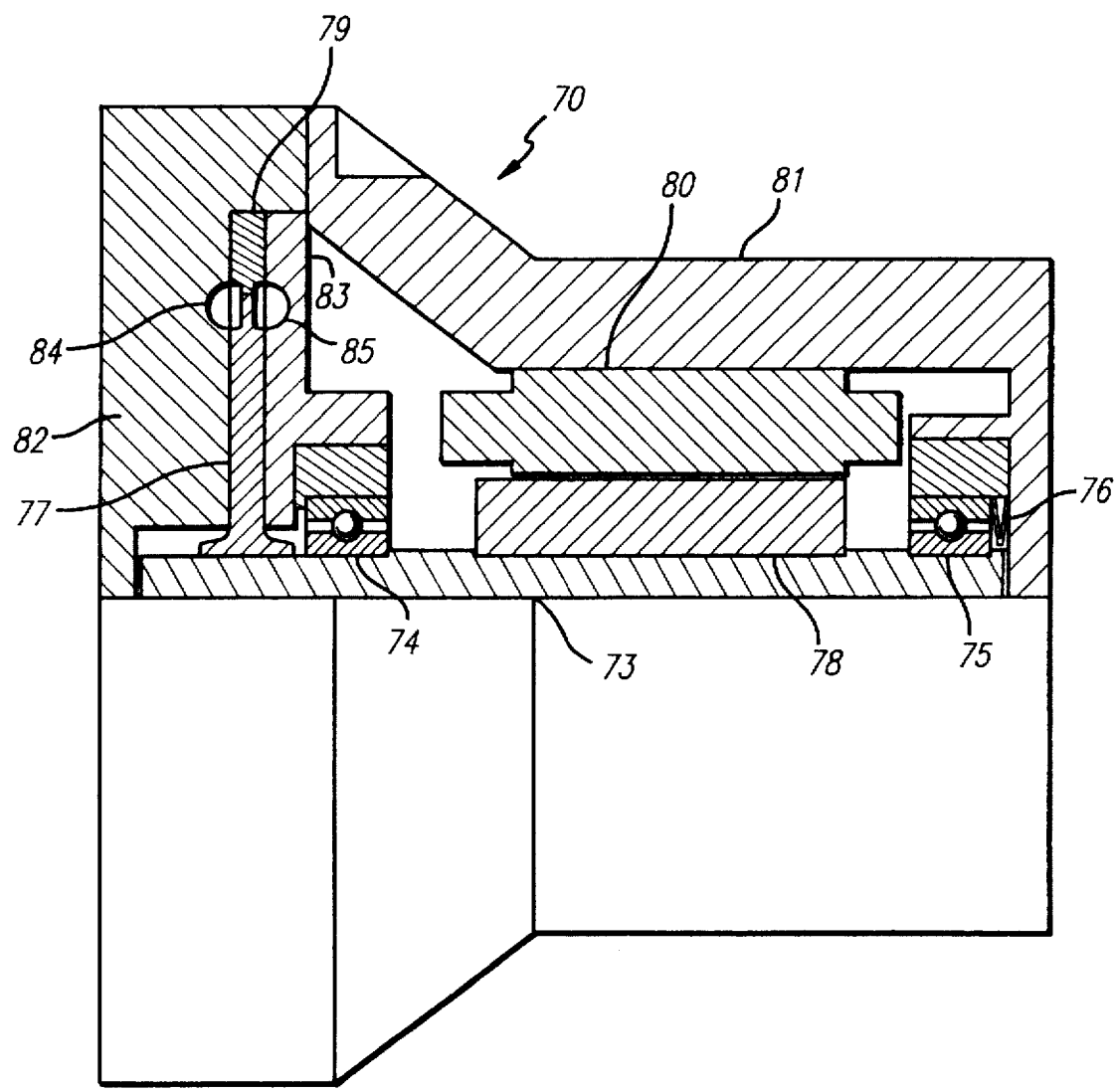
Figure 8:
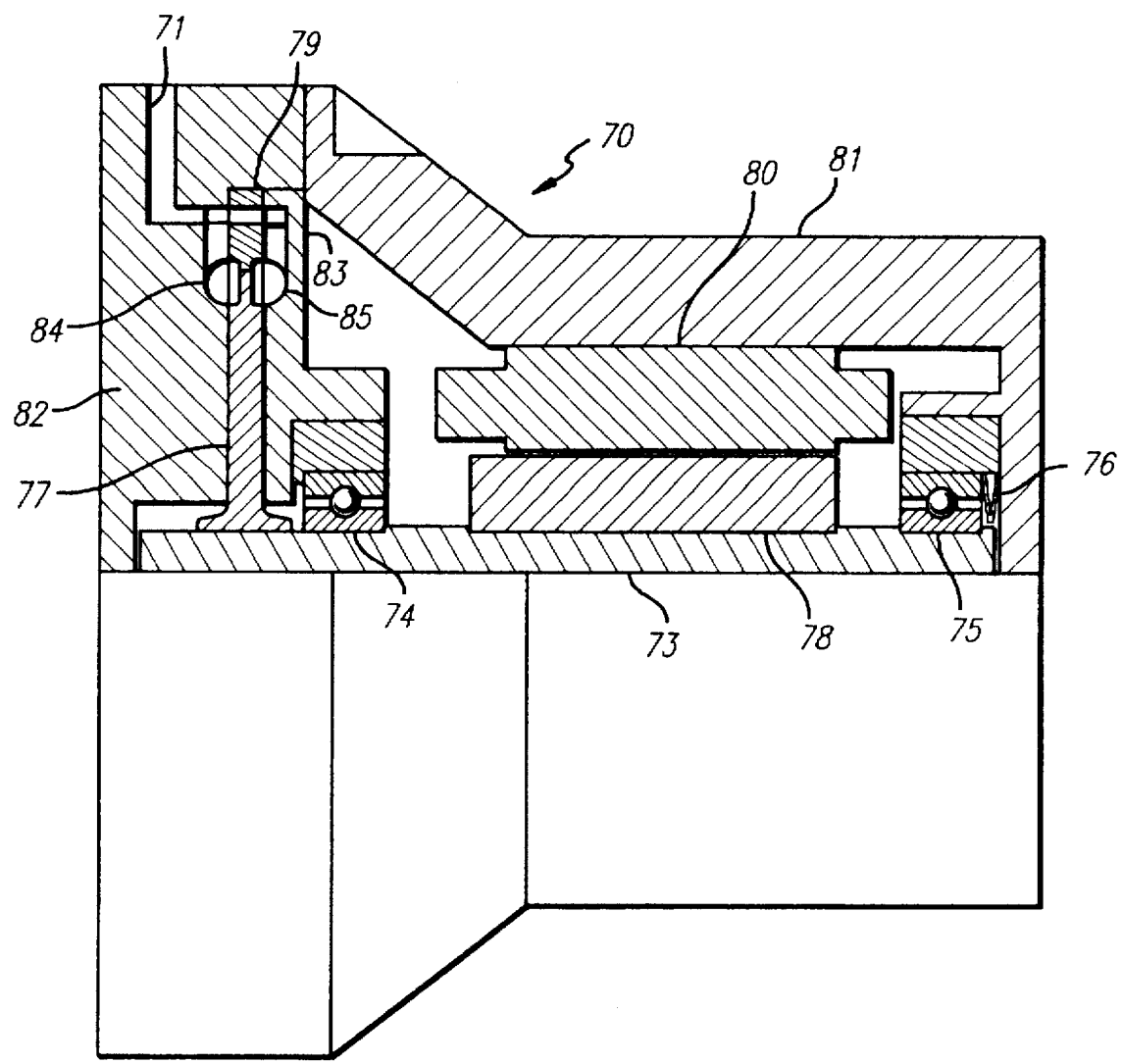
Figure 9:
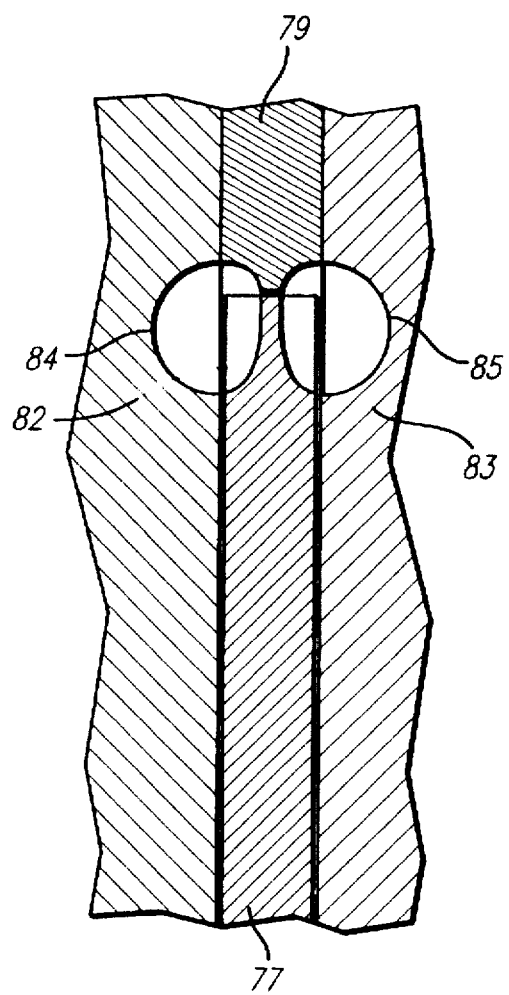
Figure 10:
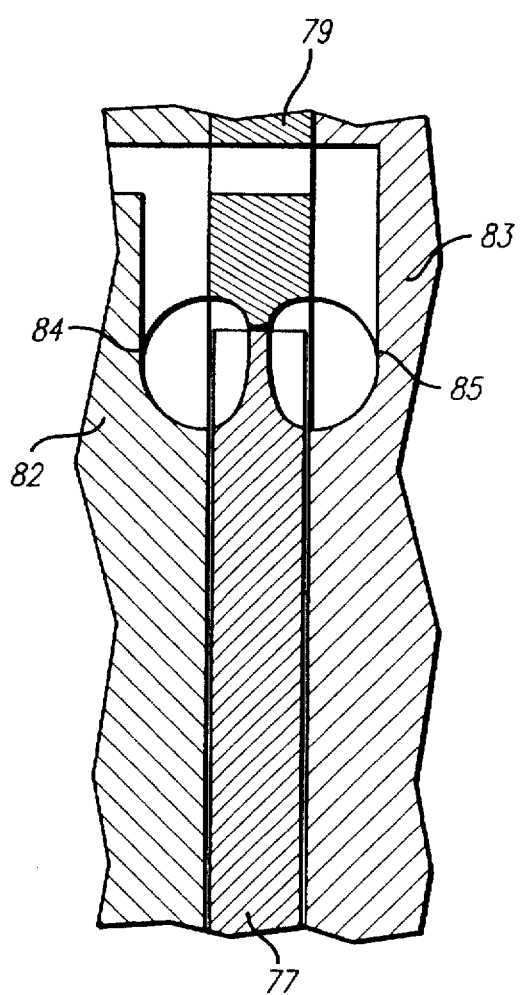
Figure 11:
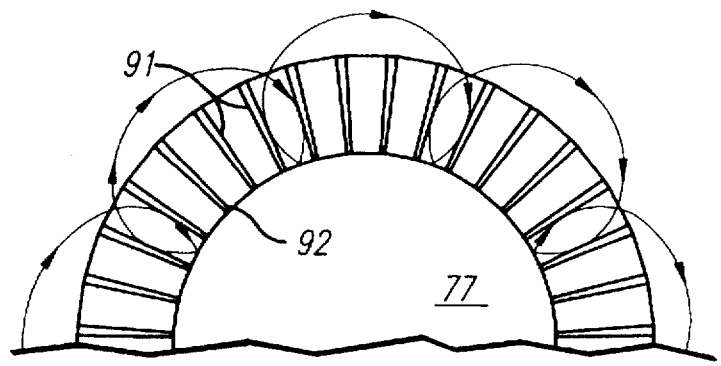
Figure 12:
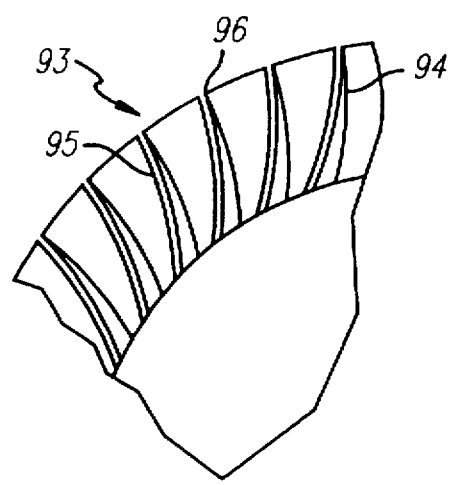
Figure 13:
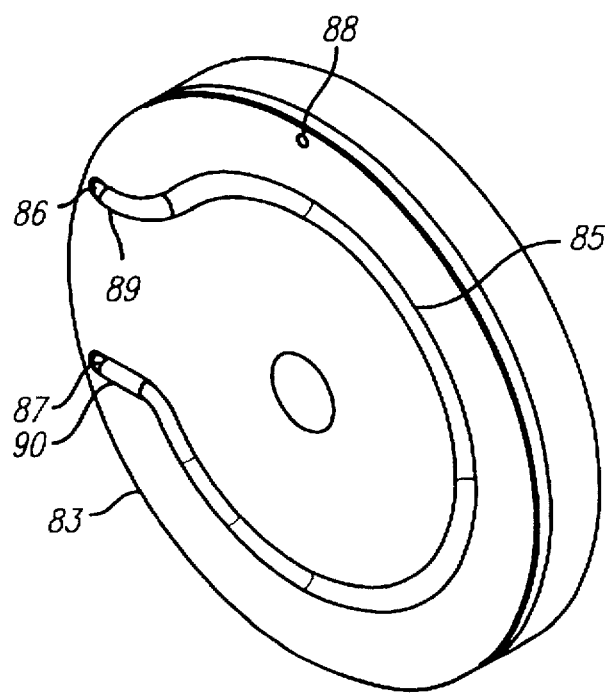
Figure 14:
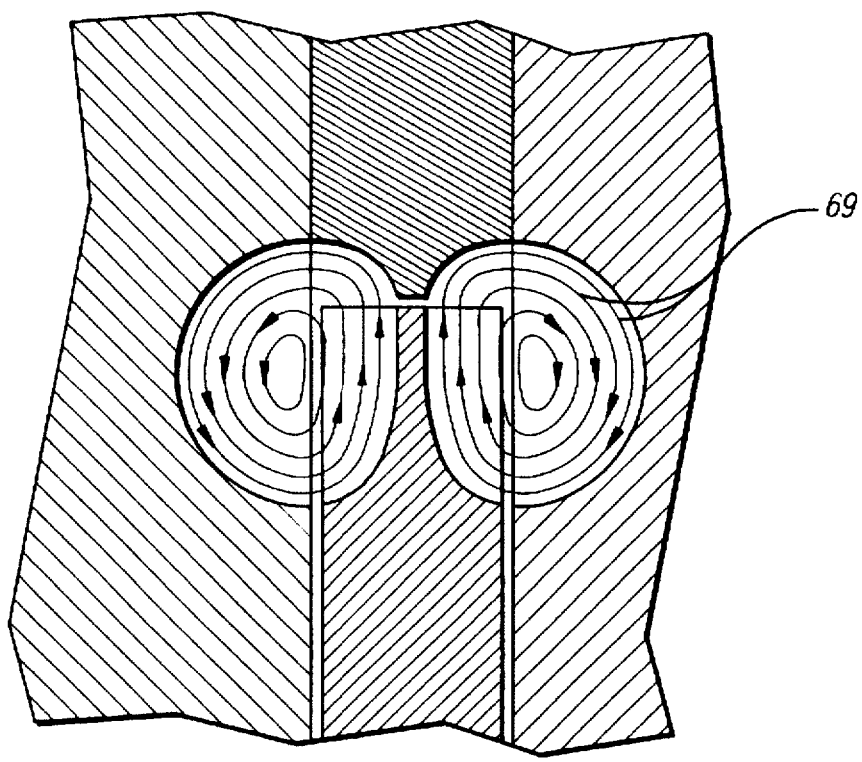
Figure 15:
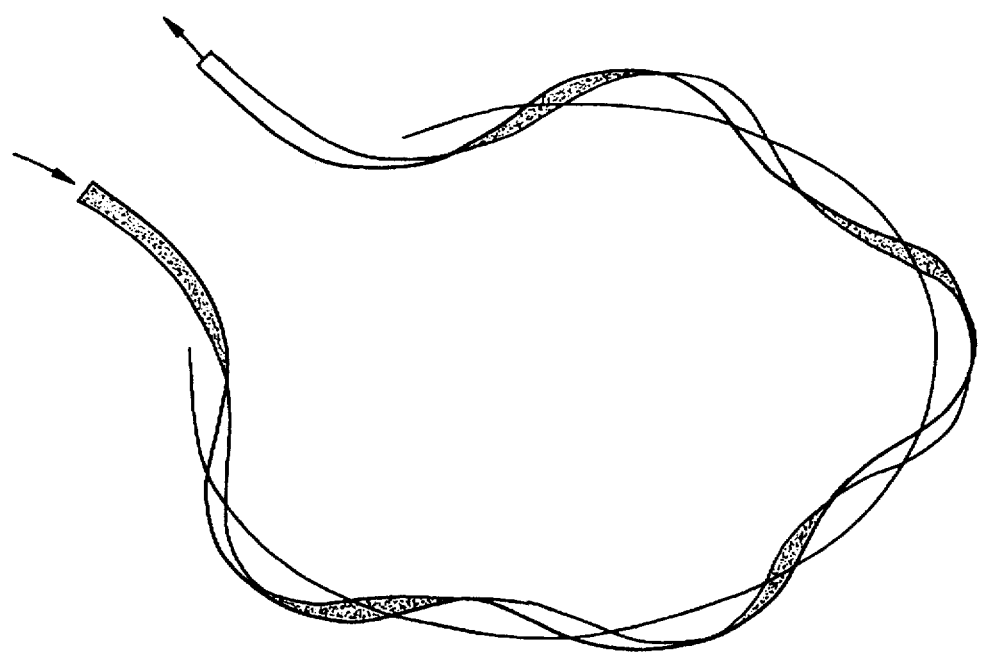
Figure 16:
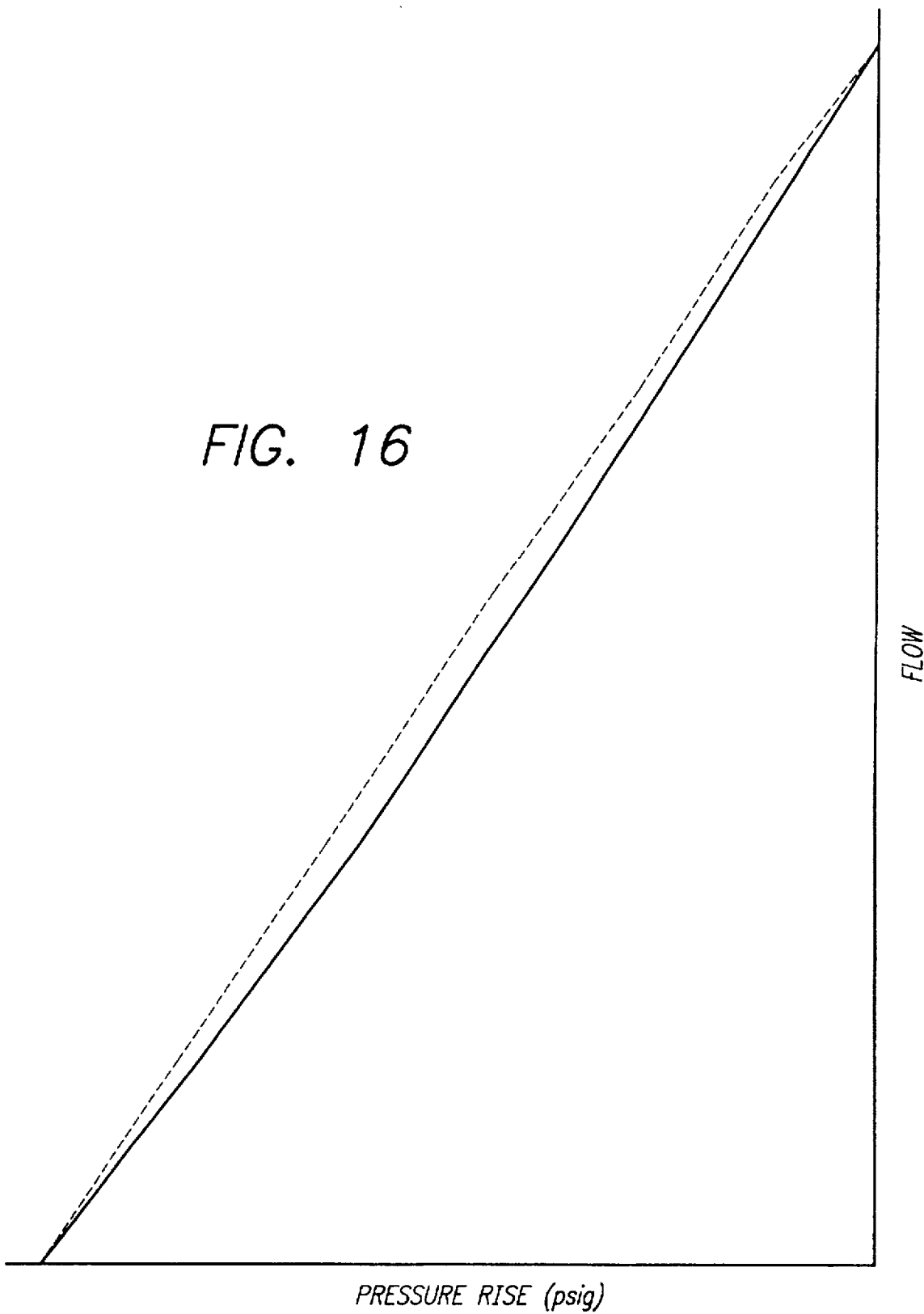

Having thus described the present invention in general terms, reference will now be made to the accompanying drawings in which:

FIG. 1 is a plan view of a turbogenerator set utilizing the liquid fuel pressurization and control system and method of the present invention;

FIG. 2 is a perspective view, partially cut away, of a turbogenerator for the turbogenerator set of FIG. 1;

FIG. 3 is a block diagram, partially schematic, view of the liquid fuel pressurization and control aspect of the pressurization and control system and method of the present invention;

FIG. 4 is a block diagram, partially schematic, view of the air assist aspect of the pressurization and control system and method of the present invention;

FIG. 5 is a block diagram, partially schematic, view of both the liquid fuel pressurization and air assist aspects of the pressurization and control system and method of the present invention;

FIG. 6 is an end view of a helical flow pump or compressor for use in either the liquid fuel pressurization or air assist aspects of the liquid fuel pressurization and control system and method of the present invention;

FIG. 7 is a cross sectional view of the helical flow pump or compressor of FIG. 6 taken along line 7—7;

FIG. 8 is a cross sectional view of the helical flow pump or compressor of FIG. 6 taken along line 8—8;

FIG. 9 is an enlarged sectional view of the impeller blade/stator channel area of the helical flow pump or compressor of FIG. 7;

FIG. 10 is an enlarged sectional view of the impeller blade/stator channel area of the helical flow pump or compressor of FIG. 8;

FIG. 11 is an enlarged partial plan view of the helical flow pump or compressor impeller blades illustrating the flow of liquid fuel therethrough;

FIG. 12 is an enlarged partial plan view of a helical flow pump or compressor impeller having curved blades;

FIG. 13 is an exploded perspective view of a stator channel plate of the helical flow pump or compressor of FIGS. 6–10;

FIG. 14 is an enlarged sectional view illustrating fluid flow streamlines in the impeller blades and fluid flow stator channels;

FIG. 15 is a schematic view illustrating the flow of liquid fuel through a helical flow pump or compressor; and FIG. 16 is a graph of the pressure versus flow characteristics of a helical flow pump or compressor.

DETAILED DESCRIPTION OF THE PREFERRED EMBODIMENTS

A turbogenerator set 10 utilizing the liquid fuel pressurization and control system and method of the present invention is illustrated in FIG. 1. A mounting platform 11 supports the turbogenerator 12, associated ducts 13, air assist helical flow compressor 14, turbogenerator set power controller 15, and line commutated inverter 16. In addition, a liquid fuel pressurization helical flow pump 18 is provided in liquid fuel tank 19.

The turbogenerator 12 is illustrated in detail in FIG. 2 and generally comprises a permanent magnet generator 20, a power head 21, a combustor 22 and a recuperator (or heat exchanger) 23.

The permanent magnet generator 20 includes a permanent magnet rotor or sleeve 26, having a permanent magnet disposed therein, rotatably supported within a permanent magnet stator 27 by a pair of spaced journal bearings. Radial permanent magnet stator cooling fins 28 are enclosed in an outer cylindrical sleeve 29 to form an annular air flow passage which cools the permanent magnet stator 27 and thereby preheats the air passing through on its way to the power head 21.

The power head 21 of the turbogenerator 12 includes compressor 30, turbine 31, and bearing rotor 32 through which the tie rod 33 to the permanent magnet rotor 26 passes. The compressor 30, having compressor impeller or wheel 34 which receives preheated air from the annular air flow passage in cylindrical sleeve 29 around the permanent magnet stator 27, is driven by the turbine 31 having turbine wheel 35 which receives heated exhaust gases from the combustor 22 supplied with preheated air from recuperator 23. The compressor wheel 34 and turbine wheel 35 are supported on a bearing shaft or rotor 32 having a radially extending bearing rotor thrust disk 36. The bearing rotor 32 is rotatably supported by a single journal bearing within the center bearing housing 37 while the bearing rotor thrust disk 36 at the compressor end of the bearing rotor 32 is rotatably supported by a bilateral thrust bearing.

Intake air is drawn through the permanent magnet generator 20 by the compressor 30 which increases the pressure of the air and forces it into the recuperator 23. In the recuperator 23, exhaust heat from the turbine 31 is used to preheat the air before it enters the combustor 22 where the preheated air is mixed with fuel and burned. The combustion gases are then expanded in the turbine 31 which drives the compressor 30 and the permanent magnet rotor 26 of the permanent magnet generator 20 which is mounted on the same shaft as the turbine 31. The expanded turbine exhaust gases are then passed through the recuperator 23 before being discharged from the turbogenerator 12.

As illustrated in FIG. 3, the liquid fuel pressurization aspect of the present invention includes a helical flow pump 18, with motor 42, in liquid fuel tank 19. The liquid fuel tank provides liquid fuel, such as diesel oil or gasoline, to the liquid fuel pressurization helical flow pump 18 via a liquid fuel inlet 40. Elevated pressure liquid fuel is provided from the helical flow compressor outlet 41 to the turbogenerator combustor 22 injector 24 via fuel injector tube 38. The helical flow pump 18 would be driven by the permanent magnet motor 42 which could also function as a permanent magnet generator. A helical flow pump motor inverter drive 43 provides three (3) phase electrical power to the helical flow pump motor 42 via electrical connection 44 and receives operational phase and speed data from the helical flow pump motor 42 via electrical connection 45.

The helical flow compressor motor inverter drive 43 receives torque control signals and maximum speed control signals 46 from the turbogenerator set power controller 15. The turbogenerator set power controller 15, which includes a central processing unit, receives a helical flow pump speed and current feedback signal 47 from the helical flow compressor motor inverter drive 43. A turbogenerator turbine exhaust gas temperature signal 50 from a thermocouple 51 in the turbogenerator turbine exhaust gas duct 39 is also provided to the turbogenerator set power controller 15. The combustor 22 also includes a plurality of compressed air inlets 53 which provide pressurized air from the turbogenerator compressor 30 to the combustor 22.

The liquid fuel outlet 41 of the liquid fuel pressurization helical flow pump 18 may include a pressure sensor 48 to provide liquid fuel pressure data to the turbogenerator set power controller 15 via line 49. The turbogenerator permanent magnet generator 20 exchanges three phase electrical power data with the turbogenerator set power controller 15 via lines 56, 57, and 58. Included in this data would be turbogenerator speed.

While the liquid fuel pressurization has been described as being performed by a helical flow pump driven by a permanent magnet motor/generator, it should be recognized that the helical flow compressor can be driven by other electrical means such as an induction motor or a brush type d.c. motor. Also, other pressurization means, such as a gear pump, can be utilized to pressurize the liquid fuel.

The pressurized liquid fuel can be provided directly to a single fuel injector as shown in FIG. 3 or alternately to a liquid fuel manifold 52 as shown in FIG. 2. Three (3) fuel injectors 24 are shown in FIG. 2 and the injectors 24 can be supplied with pressurized liquid fuel from the liquid fuel manifold 52. Flow control valves 59 can be provided in each liquid fuel line, except one, between the liquid fuel manifold 52 and the injectors 24. In order to sustain low output power operation, the flow control valves 59 can be individually controlled to an on/off condition (to separately use one (1) or two (2) injectors individually) or they can be modulated together. The flow control valves 59 can be opened by liquid fuel pressure or their operation can be controlled or augmented with a solenoid.

As illustrated in FIG. 4, the air assist helical flow compressor 14, having a compressor motor 62, includes a compressor discharge air inlet 60 to provide compressor discharge air flow from the turbogenerator compressor to the air assist helical flow compressor 14 and a pressurized air outlet 61 to provide elevated pressure air to the turbogenerator combustor 22 after passing through cooling tube 25 around fuel injector tube 38 to the injectors 24. While the helical flow compressor motor 62 can be an induction motor, it would preferably be a permanent magnet motor which could also function as a permanent magnet generator. A helical flow compressor motor inverter drive 63 provides three (3) phase electrical power to the helical flow compressor motor 62 via electrical connection 64 and receives operational phase and speed data from the helical flow compressor motor 62 via electrical connection 65. The helical flow compressor motor inverter drive 63 receives torque control signals and maximum speed control signals 66 from the turbogenerator set power controller 15. The turbogenerator set power controller 15, which includes a central processing unit, receives a helical flow compressor speed and current feedback signal 67 from the helical flow compressor motor inverter drive 63. A turbogenerator turbine exhaust gas temperature signal 50 from a thermocouple 51 in the turbogenerator turbine exhaust gas duct 39 is also provided to the turbogenerator set power controller 15. The combustor 22 also includes a plurality of compressed combustion air inlets 53 which also provide pressurized air from the turbogenerator compressor 30 to the combustor 22. The turbogenerator permanent magnet generator 20 exchanges three phase data with the turbogenerator set power controller 15 via lines 56, 57, and 58. Included in this data would be turbogenerator speed.

The air assist helical flow compressor will increase the compressor discharge pressure approximately six (6) psi before the air is used to cool the pressurized liquid fuel in the fuel injector tube 38. It is then mixed with the pressurized liquid fuel in the injectors 24 to further atomize or vaporize the pressurized liquid fuel as it accelerates the pressurized liquid fuel into the combustion chamber. Since the pressurized air has a higher velocity than the pressurized liquid fuel, it will break up the liquid fuel into fine droplets.

In FIG. 5, there is illustrated a liquid fuel pressurization and control system and method of the present invention in which the liquid fuel pressurization aspect and the air assist aspect are integrated into a single system. The compressor speed and current feedback signal 47 from the liquid fuel pressurization pump motor inverter drive 43 and the helical flow compressor speed and current feedback signal 67 from the air assist helical flow compressor motor inverter drive 63 are both provided to the turbogenerator set power controller 15 which provides torque control signal and maximum speed control signals 46 and 66 to the compressor inverter drives 43 and 63, respectively.

A single stage helical flow pump or compressor permanent magnet motor/generator 70 is illustrated in FIGS. 6–8 and includes a fluid inlet 71 to provide fluid to the helical flow pump or compressor 14 of the helical flow pump or compressor permanent magnet motor/generator 70 and a fluid outlet 72 to remove fluid from the helical flow pump or compressor 14 of the helical flow compressor permanent magnet motor/generator 70. It is referred to as a motor/generator since it can function equally well as a motor to produce shaft horsepower or as a generator to produce electrical power.

The helical flow pump or compressor permanent magnet motor/generator 70 includes a shaft 73 rotatably supported by bearings 74 and 75. The position of bearing 75 is maintained by back-to-back Belleville type washers 76 which also prevent rotation of the outer bearing race. An impeller 77 is mounted at one end of the shaft 73, while permanent magnet rotor 78 is mounted at the opposite end thereof between bearings 74 and 75.

A stripper plate 79 is disposed radially outward from impeller 77. The permanent magnet rotor 78 on the shaft 73 is disposed to rotate within permanent magnet stator 80 which is disposed in the permanent magnet housing 81.

The impeller 77 is disposed to rotate between stator channel plate 82 and stator channel plate 83. The stripper plate 79 has a thickness slightly greater than the thickness of impeller 77 to provide a running clearance for the impeller 77 between stator channel plates 82 and 83. Stator channel plate 82 includes a generally horseshoe shaped fluid flow stator channel 84 having an inlet to receive fluid from the fluid inlet 71. Stator channel plate 83 also includes a generally horseshoe shaped fluid flow stator channel 85 which mirrors the generally horseshoe shaped fluid flow stator channel 84 in the stator channel plate 82.

Each of the stator channels 84 and 85 include an inlet 86 and an outlet 87 disposed radially outward from the channel with the inlets and outlets of generally horseshoe shaped fluid flow stator channel 84 and generally horseshoe shaped fluid flow stator channel 85 axially aligned. The fluid inlet 71 extends through stator channel plate 82 and stripper plate 79 to the inlets 86 of both of stator channel plate generally horseshoe shaped fluid flow stator channel 84 and stator channel plate generally horseshoe shaped fluid flow stator channel 85. The fluid outlet 72 extends from the outlets 87 of both stator channel plate generally horseshoe shaped fluid flow stator channel 84 and stator channel plate generally horseshoe shaped fluid flow stator channel 85.

The fluid flow stator channels are best illustrated in FIG. 13 which is a perspective view of the stator channel plate 83. The generally horseshoe shaped stator channel 85 is shown along with inlet 86 and outlet 87. The inlet 86 and outlet 87 would normally be displaced approximately thirty (30) degrees. An alignment or locator hole 88 is provided in each of the stator channel plates 82 and 83 and in the stripper plate 79.

The impeller blades or buckets are best illustrated in FIGS. 11 and 12. The radial outward end of the impeller 77 includes a plurality of blades 92. While these blades 92 may be radially straight as shown in FIG. 11, there may be specific applications and/or operating conditions where curved blades may be more appropriate or required.

FIG. 12 illustrates a portion of a helical flow compressor impeller having a plurality of curved blades 93. The curved blade base or root 94 has less of a curve than the leading edge 95 thereof. The curved blade tip 96, at both the root 94 and leading edge 95 would be generally radial.

In a helical flow pump or compressor, fluid enters one end of a generally horseshoe shaped fluid flow stator channel adjacent to the impeller blades 92. The fluid is then directed to the impeller blades 92 by a pressure gradient, accelerated through and out of the blades 92 by centrifugal force, from where it reenters the fluid flow stator channel. During this time the fluid has been traveling tangentially around the periphery of the helical flow compressor. As a result of this, a helical flow is established as generally shown in FIGS. 14 and 15. The dotted line in FIG. 15 represents the center of the impeller-stator channel.

While the helical flow compressor is shown in a single pressurization stage configuration which is all that would normally be required in this system, it should be recognized that the liquid fuel pressurization helical flow pump 18 and the air assist helical flow compressor 14 may have two (2) pressurization stages or as many as three (3) pressurization stages. The helical flow compressor permanent magnet motor/generator is described in additional detail in U.S. patent application Ser. No. 08/730,946 filed on Oct. 16, 1996 by Robert W. Bosley, Ronald F. Miller, and Joel B. Wacknov entitled "Helical Flow Compressor/Turbine Permanent Magnet Motor/Generator", assigned to the same assignee as this application, and is herein incorporated by reference.

The turbogenerator 12 is able to operate on whatever liquid fuel is available. Ignition of the liquid fuel produces heat and the liquid fuel flow is sustained and accelerates the turbogenerator which raises the pressure of the turbogenerator compressor 30. As the turbogenerator compressor 30 increases the pressure of the combustion air, the liquid fuel pressure must be correspondingly increased to keep it somewhat higher so that there is a positive flow of liquid fuel to the combustor injectors.

In order to start the system, the helical flow pump motor 42 would normally be run to increase the liquid fuel pressure to achieve a positive fuel flow to the combustor injectors. At the same time, the turbogenerator permanent magnet generator 20 is utilized to run-up the turbogenerator speed. Light-off will occur when the correct fuel air ratio, a function of the combustion process, is achieved. Before light-off, the speed of the helical flow pump is the controlling factor. After light-off, the controlling factor will be exhaust gas temperature during the remainder of the starting process. Once the start-up is completed and idle speed set point is achieved (normally fifty thousand (50,000) rpm) the system will switch to a torque control mode.

The liquid fuel header pressure that is needed to operate the turbogenerator has to be extremely low for ignition. As the turbogenerator speed increases, the turbogenerator's compressor discharge pressure will increase up to as high as thirty seven (37) psi gauge. The liquid pressure in the header that feeds the combustor injectors needs to be between three tenths (0.3) psi above turbogenerator compressor discharge pressure to approximately a pound or pound and a half above turbogenerator compressor discharge pressure in order to accommodate liquid fuel line losses or pressure drops in the various components in the liquid fuel line to the combustor injectors. As the turbogenerator speed increases, the pressure that goes into the liquid fuel header can be increased.

When the helical flow pump is operating at near zero speed, there is a very low gain in terms of the pressure rise since pressure rise is a function of speed squared. Once, however, the system is run in a torque control mode, the system is much more forgiving since any incremental change in torque will produce a well defined change in helical flow pump discharge pressure. This system is capable of operating in either a speed or torque control mode particularly if it is operating open loop. As currently configured, the system operates in a speed control mode for start up and a torque control mode for steady state operation.

Once you have light-off, exhaust gas temperature increases. If the turbogenerator speed is known, turbogenerator compressor discharge pressure can be calculated as can the liquid fuel pressure. It is a simple matter to calculate what helical flow pump speed is required to obtain the liquid fuel pressure at the header for the combustor injectors. With header pressure known, the turbogenerator speed for any mode will be known. There is a direct relationship between helical flow pump speed and turbogenerator speed for any turbogenerator load.

The torque on the helical flow pump motor, a function of the helical flow pump permanent magnet motor current, can readily be monitored. Alternately, the helical flow pump can run with the impellers turning but no torque in the helical flow pump motor or a torque from the helical flow pump motor which is simply providing power for the bearings and windage drag. The system inherently includes four feedback signals. These are the speed of the turbogenerator which provides compressor discharge pressure, the turbogenerator output power, turbine exhaust gas temperature and ambient air temperature. When operating at any given condition and a change in power is required, even before a change in command is provided to the helical flow pump, the change of conditions to satisfy the new power demand is known. In other words, it is not necessary to wait for an error to determine what is required to correct the error. This enables a less limited slew rate and permits more aggressive damping which means less overshoot risk and less authority for the integral controls.

In addition, there may be hardware implemented speed limits as a backup to the soft limits and software which are in the system. While the limits of the software based limits are reached long before you actually hit the limits, the hardwired limits are a really strong safety clamp. The software limits are soft and somewhat cushioned with a small damping factor in order so as not to precipitate instability.

When the system is being operated at a constant speed and experiences an increase in load, the speed will start to drop until the liquid fuel flow is increased to maintain a constant speed of the turbogenerator. When higher liquid fuel flow is requested, a command is provided to the helical flow pump to increase its speed to compensate for the change in power required. In an open loop, the speed is increased and then trimmed back to operate at peak efficiency. Unless the system is directly connected to a utility or can receive significant electrical power from batteries, turbogenerator output power cannot instantaneously be increased since output fuel flow cannot instantaneously be increased since turbogenerator turbine inlet temperature cannot instantaneously be increased.

The system will have both a transient temperature limit and a steady state temperature limit. The transient temperature limits will be higher than the steady state temperature limits so that a low transient change can be accommodated without any significant drop-off in turbogenerator speed. Energy is required to accelerate the helical flow pump impellers and that energy has to come from somewhere. It is either taken from thermal energy or delivered energy or any combination of the two. The helical flow pump has a lightweight impeller and thus has a better transient response time than other pumps.

If the turbogenerator load suddenly drops off significantly, the energy stored in the turbogenerator recuperator may require some kind of off-load bank, such as an electrical resistance bank to dissipate that energy. In stand-alone applications, a programmable device like a human interface will program a minimum load setting and a maximum load setting to prevent operating above a certain selected speed. Alternately, a valve can be utilized to simple dump discharge air pressure. It is simple to shut down the system if there is no longer any load by closing a solenoid valve upstream of the helical flow pump. If you shut off the liquid fuel flow, the system will essentially coast down to zero speed.

In deference to the hydrodynamic bearings on the turbogenerator, the system would normally be run down gradually or after a shut down the system would be restarted to run at a lower speed such as thirty thousand (30,000) or forty thousand (40,000) rpm to dissipate any heat remaining in the recuperator.

In most conventional systems, there would be a separate liquid fuel pump and a separate fuel metering valve. The system of the present invention eliminates the requirement for a separate metering valve. The helical flow pump can effectively serve both functions of flow control and pressure control. By combining the fuel pressure and fuel flow control in the helical flow pump, it is possible to maintain turbogenerator speed within plus or minus ten (10) rpm over a speed range of from approximately twenty four thousand (24,000) rpm to approximately ninety six thousand (96,000) rpm with a turbine exhaust gas temperature control within two (2) degrees Fahrenheit. By primarily setting up pressure control such that a very small change in turbogenerator speed makes a big change in flow the turbogenerator essentially stabilizes itself. Previous systems where the liquid fuel pump is run directly off the turbogenerator shaft with some kind of gear reduction, cannot even approximate this capability.

In previous systems, a flow control valve is then used to determine the liquid fuel flow to the combustor injectors. The flow control valve is usually computer controlled with the computer receiving information about turbogenerator speed, turbine exhaust gas temperature, and required turbogenerator power. The amount of liquid fuel flowing through the flow control valve would be a function of these three (3) parameters and their rate of change. This type of system is relatively complicated and is also a fairly large system.

On the other hand, the liquid fuel pressurization and control system and method of the present invention overcomes all of the above disadvantages of previous systems. It is not only relatively independent of load, but it does not require a speed sensor and is both stable and self-damping.

While specific embodiments of the invention have been illustrated and described, it is to be understood that these are provided by way of example only and that the invention is not to be construed as being limited thereto but only by the proper scope of the following claims.

What we claim is:

1. A liquid fuel pressurization and control system, comprising:

a turbogenerator set including a turbogenerator, a turbogenerator power controller, and a liquid fuel tank, said turbogenerator including a compressor, a turbine, a combustor with a plurality of air assisted liquid fuel injectors and a plurality of air inlets, a recuperator, and a permanent magnet motor/generator;

a fuel pump disposed in said fuel tank for pressurizing said fuel from said fuel tank and supplying pressurized liquid fuel to the liquid fuel nozzle injectors of said turbogenerator combustor, said turbogenerator compressor supplying compressed air to said air inlets of said turbogenerator combustor;

an electric motor operably associated with said fuel pump to drive said fuel pump; and an electric motor inverter drive operably associated with said electric motor to provide electrical power to said electric motor and receive operational data from said electric motor, said electric motor inverter drive also operably associated with said turbogenerator power controller to receive control signals from said turbogenerator power controller, said turbogenerator power controller also receiving operational data from said fuel pump motor inverter drive and turbogenerator parameter signals from said turbogenerator.

2. The liquid fuel pressurization and control system of claim 1 wherein said plurality of liquid fuel injectors are supplied with pressurized liquid fuel from said fuel pump through a liquid fuel manifold.

3. The liquid fuel pressurization and control system of claim 2 wherein a liquid fuel control valve is provided between the liquid fuel manifold and each except one of said plurality of liquid fuel injectors.

4. The liquid fuel pressurization and control system of claim 3 wherein said liquid fuel control valves can be individually controlled either open or closed.

5. The liquid fuel pressurization and control system of claim 3 wherein said liquid fuel control valves can be modulated using electrical power and electrical control signals.

6. The liquid fuel pressurization and control system of claim 3 wherein said liquid fuel control valves can be modulated using the fluidic power and fluidic control signal aspects of the liquid fuel pressure at the control valves.

7. The liquid fuel pressurization and control system of claim 1 wherein said pump is a helical flow pump.

8. The liquid fuel pressurization and control system of claim 1 wherein said pump is a helical flow pump first stage integrated with a gear pump second stage on a common shaft.

9. The liquid fuel pressurization and control system of claim 7 wherein said electric motor for said helical flow pump is an induction motor.

10. The liquid fuel pressurization and control system of claim 7 wherein said electric motor for said helical flow pump is a brush type d.c. motor.

11. The liquid fuel pressurization and control system of claim 7 wherein said electric motor for said helical flow pump is a permanent magnet motor.

12. The liquid fuel pressurization and control system of claim 11 wherein said helical flow pump and said permanent magnet motor share a common shaft.

13. The liquid fuel pressurization and control system of claim 7 wherein said operational data received by said helical flow pump motor inverter from said helical flow pump motor includes motor torque data.

14. The liquid fuel pressurization and control system of claim 7 wherein said operational data received by said helical flow pump motor inverter from said helical flow pump motor includes motor speed data.

15. The liquid fuel pressurization and control system of claim 7 wherein said operational data received by said helical flow pump motor inverter from said helical flow pump motor includes motor phase data.

16. The liquid fuel pressurization and control system of claim 7 wherein said operational data received by said helical flow pump motor inverter from said helical flow pump motor includes both motor phase data and motor speed data.

17. The liquid fuel pressurization and control system of claim 7 wherein said control signal received by said helical flow pump inverter drive from said turbogenerator power controller includes a torque control signal.

18. The liquid fuel pressurization and control system of claim 7 wherein said control signal received by said helical flow pump inverter drive from said turbogenerator power controller includes a speed or maximum speed control signal.

19. The liquid fuel pressurization and control system of claim 7 wherein said control signal received by said helical flow pump inverter drive from said turbogenerator power controller includes both a torque control signal and a maximum speed control signal.

20. The liquid fuel pressurization and control system of claim 1 wherein said turbogenerator parameter signal received by said turbogenerator power controller includes turbogenerator speed.

21. The liquid fuel pressurization and control system of claim 1 wherein said turbogenerator parameter signal received by said turbogenerator power controller includes turbogenerator turbine exhaust gas temperature.

22. The liquid fuel pressurization and control system of claim 1 wherein said turbogenerator parameter signal received by said turbogenerator power controller includes both turbogenerator speed and turbogenerator turbine exhaust gas temperature.

23. The liquid fuel pressurization and control system of claim 1 wherein said operational data from said fuel pump inverter drive received by said turbogenerator power controller includes a fuel pump/motor speed signal.

24. The liquid fuel pressurization and control system of claim 7 wherein said helical flow pump outlet includes a pressure sensor to provide a liquid fuel outlet pressure signal to said turbogenerator power controller.

25. The liquid fuel pressurization and control system of claim 12 wherein said helical flow pump and permanent magnet motor on a common shaft comprise:
 a housing including a permanent magnet stator positioned at one end thereof;
 a shaft rotatably supported within said housing;
 a permanent magnet rotor mounted on said shaft at said one end thereof and operably associated with said permanent magnet stator; and
 an impeller mounted at the other end of said shaft, said impeller having at least one row of a plurality of blades,
 said housing including a generally horseshoe shaped fluid flow stator channel operably associated with each row of the plurality of impeller blades, a fluid inlet at one end of said generally horseshoe shaped fluid flow stator channel, and a fluid outlet at the other end of said generally horseshoe shaped fluid flow stator channel, the fluid in said generally horseshoe shaped fluid flow stator channel proceeding from said fluid inlet to said fluid outlet while following a generally helical flow path with multiple passes through said impeller blades.

26. The liquid fuel pressurization and control system of claim 25 wherein said plurality of impeller blades is straight radial blades.

27. The liquid fuel pressurization and control system of claim 25 wherein said plurality of impeller blades is curved blades.

28. The liquid fuel pressurization and control system of claim 1 and in addition:
 a compressor to receive compressor discharge air from said turbogenerator compressor and deliver further compressed compressor discharge air to said plurality of air assisted liquid fuel injectors to aid atomization of the pressurized liquid fuel in said fuel/air injectors;
 an electric motor operably associated with said compressor discharge air compressor to drive said compressor discharge air compressor; and
 an electric motor inverter drive operably associated with said electric motor to provide electrical power to said electric motor and receive operational data from said electric motor, said electric motor inverter drive also operably associated with said turbogenerator power controller to receive control signals from said turbogenerator power controller, said turbogenerator power controller also receiving turbogenerator parameter signals from said turbogenerator.

29. The liquid fuel pressurization and control system of claim 28 wherein said compressor discharge air compressor is a helical flow compressor.

30. The liquid fuel pressurization and control system of claim 29 wherein said motor for said helical flow compressor is a permanent magnet motor.

31. The liquid fuel pressurization and control system of claim 30 wherein said helical flow compressor and said permanent magnet motor share a common shaft.

32. The liquid fuel pressurization and control system of claim 31 wherein said helical flow compressor and permanent magnet motor on a common shaft comprise:
 a housing including a permanent magnet stator positioned at one end thereof;
 a shaft rotatably supported within said housing;
 a permanent magnet rotor mounted on said shaft at said one end thereof and operably associated with said permanent magnet stator; and
 an impeller mounted at the other end of said shaft, said impeller having at least one row of a plurality of blades,
 said housing including a generally horseshoe shaped fluid flow stator channel operably associated with each row of the plurality of impeller blades, a fluid inlet at one end of said generally horseshoe shaped fluid flow stator channel, and a fluid outlet at the other end of said generally horseshoe shaped fluid flow stator channel, the fluid in said generally horseshoe shaped fluid flow stator channel proceeding from said fluid inlet to said fluid outlet while following a generally helical flow path with multiple passes through said impeller blades.

33. The helical flow compressor permanent magnet motor of claim 32 wherein said plurality of impeller blades is straight radial blades.

34. The helical flow compressor permanent magnet motor of claim 32 wherein said plurality of impeller blades is curved blades.

35. A liquid fuel pressurization and control system, comprising:
 a turbogenerator set including a turbogenerator, a turbogenerator power controller, and a liquid fuel tank, said turbogenerator including a compressor, a turbine, a combustor with a plurality of liquid fuel injectors and a plurality of compressed air inlets, a recuperator, and a permanent magnet generator;
 a compressor to receive compressor discharge air from said turbogenerator compressor and deliver further compressed compressor discharge air to said plurality of liquid fuel injectors to assist atomization of the pressurized liquid fuel in said injectors;
 an electric motor operably associated with said compressor to drive said compressor; and an electric motor inverter drive operably associated with said electric motor to provide electrical power to said electric motor and receive operational data from said electric motor, said electric motor inverter drive also operably associated with said turbogenerator power controller to receive control signals from said turbogenerator power controller, said turbogenerator power controller also receiving turbogenerator parameter signals from said turbogenerator.

36. The liquid fuel pressurization and control system of claim 35 wherein said compressor discharge compressor is a helical flow compressor.

37. The liquid fuel pressurization and control system of claim 35 wherein said motor for said helical flow compressor is a permanent magnet motor.

38. The liquid fuel pressurization and control system of claim 35 wherein said helical flow compressor and said permanent magnet motor share a common shaft.

39. The liquid fuel pressurization and control system of claim 38 wherein said helical flow compressor and permanent magnet motor on a common shaft comprise:

a housing including a permanent magnet stator positioned at one end thereof;

a shaft rotatably supported within said housing;

a permanent magnet rotor mounted on said shaft at said one end thereof and operably associated with said permanent magnet stator; and an impeller mounted at the other end of said shaft, said impeller having two rows each of a plurality of blades, with one row of said plurality of blades disposed on either side of the outer periphery of said impeller, said housing including two generally horseshoe shaped fluid flow stator channels with one of said two generally horseshoe shaped fluid flow stator channels operably associated with one of said two rows of impeller blades and the other of said two generally horseshoe shaped fluid flow stator channels associated with the other of said two rows of impeller blades, said housing also including a stripper plate disposed radially outward from said impeller, a fluid inlet at one end of each of said two generally horseshoe shaped fluid flow stator channels, and a fluid outlet at the other end of each of said two generally horseshoe shaped fluid flow stator channels, the fluid in each of said generally horseshoe shaped fluid flow stator channels proceeding from its fluid inlet to its fluid outlet while following a generally helical flow path with multiple passes through said impeller blades associated with said generally horseshoe shaped fluid flow stator channel.

40. The helical flow compressor permanent magnet motor of claim 39 wherein said plurality of impeller blades is straight radial blades.

41. The helical flow compressor permanent magnet motor of claim 39 wherein said plurality of impeller blades is curved blades.

42. A liquid fuel pressurization and control system, comprising:

a turbogenerator set including a turbogenerator, a turbogenerator power controller, and a liquid fuel tank, said turbogenerator including a compressor, a turbine, a combustor with a plurality of liquid fuel injectors and a plurality of compressed air inlets, a recuperator, and a permanent magnet generator;

a pump disposed in said fuel tank for pressurizing said fuel from said fuel tank and supplying pressurized liquid fuel to the liquid fuel injectors of said turbogenerator combustor through a fuel injector tube;

an electric motor operably associated with said pump to drive said pump;

an electric motor inverter drive operably associated with said electric motor to provide electrical power to said electric motor and receive operational data from said electric motor, said electric motor inverter drive also operably associated with said turbogenerator power controller to receive control signals from said turbogenerator power controller, said turbogenerator power controller also receiving turbogenerator parameter signals from said turbogenerator;

a compressor to receive compressor discharge air from said turbogenerator compressor and deliver further compressed compressor discharge air to said plurality of liquid fuel injectors through an air cooling tube disposed around said fuel injector tube to cool the liquid fuel in said fuel injector tube and to atomize the pressurized liquid fuel in said injectors;

an electric motor operably associated with said compressor discharge air compressor to drive said compressor discharge air compressor; and an electric motor inverter drive operably associated with said electric motor to provide electrical power to said electric motor and receive operational data from said electric motor, said electric motor inverter drive also operably associated with said turbogenerator power controller to receive control signals from said turbogenerator power controller, said turbogenerator power controller also receiving turbogenerator parameter signals from said turbogenerator.

43. The liquid fuel pressurization and control system of claim 42 wherein said liquid fuel pump and said compressor discharge air compressor are helical flow machines.

44. The liquid fuel pressurization and control system of claim 43 wherein said motors for said helical flow pump and compressor are permanent magnet motors.

45. The liquid fuel pressurization and control system of claim 44 wherein said helical flow liquid fuel pump shares a common shaft with one of said permanent magnet motors and said compressor discharge air compressor shares a common shaft with the other of said permanent magnet motors.

46. The liquid fuel pressurization and control system of claim 3 wherein said liquid fuel control valves can be modulated using electrical power and electrical control signals, said pump is a helical flow first stage integrated with a gear pump second stage on a common shaft, and said electric motor for said pump is a brush type d.c. motor.

47. The liquid fuel pressurization and control system of claim 46 wherein said pump and said motor are on a common shaft and comprise:

a housing including a permanent magnet stator positioned at one end thereof;

a shaft rotatably supported within said housing;

a permanent magnet rotor mounted on said shaft at said one end thereof and operably associated with said permanent magnet stator; and an impeller mounted at the other end of said shaft, said impeller having at least one row of a plurality of straight radial blades, said housing including a generally horseshoe shaped fluid flow stator channel operably associated with each row of the plurality of straight radial impeller blades, a fluid inlet at one end of said generally horseshoe shaped fluid flow stator channel, and a fluid outlet at the other end of said generally horseshoe shaped fluid flow stator channel, the fluid in said generally horseshoe shaped fluid flow stator channel proceeding from said fluid inlet to said fluid outlet while following a generally helical flow path with multiple passes through said straight radial impeller blades.

48. The liquid fuel pressurization and control system of claim 47 and in addition:

a helical flow compressor to receive compressor discharge air from said turbogenerator compressor and deliver further compressed compressor discharge air to said plurality of air assisted liquid fuel injectors to aid atomization of the pressurized liquid fuel in said fuel/air injectors;

a permanent magnet motor on a common shaft with said helical flow air compressor to drive said helical flow air compressor; and a permanent magnet motor inverter drive operably associated with said permanent magnet motor to provide electrical power to said permanent magnet motor and receive operational data from said permanent magnet motor, said permanent magnet motor inverter drive also operably associated with said turbogenerator power controller to receive control signals from said turbogenerator power controller, said turbogenerator power controller also receiving turbogenerator parameter signals from said turbogenerator, said helical flow air compressor and permanent magnet motor on a common shaft comprising, a housing including a permanent magnet stator positioned at one end thereof, a shaft rotatably supported within said housing, a permanent magnet rotor mounted on said shaft at said one end thereof and operably associated with said permanent magnet stator; and an impeller mounted at the other end of said shaft, said impeller having at least one row of a plurality of straight radial blades, said housing including a generally horseshoe shaped fluid flow stator channel operably associated with each row of the plurality of straight radial impeller blades, a fluid inlet at one end of said generally horseshoe shaped fluid flow stator channel, and a fluid outlet at the other end of said generally horseshoe shaped fluid flow stator channel, the fluid in said generally horseshoe shaped fluid flow stator channel proceeding from said fluid inlet to said fluid outlet while following a generally helical flow path with multiple passes through said straight radial impeller blades.

49. The liquid fuel pressurization and control system of claim 48 wherein said operational data received by said pump motor inverter from said pump motor includes motor torque data.

50. The liquid fuel pressurization and control system of claim 48 wherein said operational data received by said pump motor inverter from said pump motor includes motor speed data.

51. The liquid fuel pressurization and control system of claim 48 wherein said operational data received by said pump motor inverter from said pump motor includes motor phase data.

52. The liquid fuel pressurization and control system of claim 48 wherein said operational data received by said pump motor inverter from said pump motor includes both motor phase data and motor speed data.

53. The liquid fuel pressurization and control system of claim 48 wherein said control signal received by said pump inverter drive from said turbogenerator power controller includes a torque control signal.

54. The liquid fuel pressurization and control system of claim 48 wherein said control signal received by said pump inverter drive from said turbogenerator power controller includes a speed or maximum speed control signal.

55. The liquid fuel pressurization and control system of claim 48 wherein said control signal received by said pump inverter drive from said turbogenerator power controller includes both a torque control signal and a maximum speed control signal.

56. The liquid fuel pressurization and control system of claim 48 wherein said turbogenerator parameter signal received by said turbogenerator power controller includes turbogenerator speed.

57. The liquid fuel pressurization and control system of claim 48 wherein said turbogenerator parameter signal received by said turbogenerator power controller includes turbogenerator turbine exhaust gas temperature.

58. The liquid fuel pressurization and control system of claim 48 wherein said turbogenerator parameter signal received by said turbogenerator power controller includes both turbogenerator speed and turbogenerator turbine exhaust gas temperature.

59. The liquid fuel pressurization and control system of claim 47 and in addition:

a helical flow compressor to receive compressor discharge air from said turbogenerator compressor and deliver further compressed compressor discharge air to said plurality of air assisted liquid fuel injectors to aid atomization of the pressurized liquid fuel in said fuel/air injectors;

a permanent magnet motor on a common shaft with said helical flow air compressor to drive said helical flow air compressor; and a permanent magnet motor inverter drive operably associated with said permanent magnet motor to provide electrical power to said permanent magnet motor and receive operational data from said permanent magnet motor, said permanent magnet motor inverter drive also operably associated with said turbogenerator power controller to receive control signals from said turbogenerator power controller, said turbogenerator power controller also receiving turbogenerator parameter signals from said turbogenerator, said helical flow air compressor and permanent magnet motor on a common shaft comprising, a housing including a permanent magnet stator positioned at one end thereof, a shaft rotatably supported within said housing, a permanent magnet rotor mounted on said shaft at said one end thereof and operably associated with said permanent magnet stator; and an impeller mounted at the other end of said shaft, said impeller having two rows each of a plurality of straight radial blades, with one row of said plurality of straight radial blades disposed on either side of the outer periphery of said impeller, said housing including two generally horseshoe shaped fluid flow stator channels with one of said two generally horseshoe shaped fluid flow stator channels operably associated with one of said two rows of straight radial impeller blades and the other of said two generally horseshoe shaped fluid flow stator channels operably associated with the other of said two rows of straight radial impeller blades, said housing also including a stripper plate disposed radially outward from said impeller, a fluid inlet at one end of each of said two generally horseshoe shaped fluid flow stator channels, and a fluid outlet at the other end of each of said two generally horseshoe shaped fluid flow stator channels, the fluid in each of said two generally horseshoe shaped fluid flow stator channels proceeding from its fluid inlet to its fluid outlet while following a generally helical flow path with multiple passes through said straight radial impeller blades associated with said generally horseshoe shaped fluid flow stator channel.

* * * * *